US 11,706,007 B2

(12) United States Patent
Yokomakura et al.

(10) Patent No.: US 11,706,007 B2
(45) Date of Patent: Jul. 18, 2023

(54) BASE STATION APPARATUS, TERMINAL APPARATUS, COMMUNICATION METHOD, AND INTEGRATED CIRCUIT

(71) Applicants: Sharp Kabushiki Kaisha, Sakai (JP); FG Innovation Company Limited, Tuen Mun (HK)

(72) Inventors: Kazunari Yokomakura, Sakai (JP); Shohei Yamada, Sakai (JP); Hidekazu Tsuboi, Sakai (JP); Hiroki Takahashi, Sakai (JP)

(73) Assignee: Sharp Kabushiki Kaisha, Sakai (JP)

(*) Notice: Subject to any disclaimer, the term of this patent is extended or adjusted under 35 U.S.C. 154(b) by 0 days.

(21) Appl. No.: 16/481,872

(22) PCT Filed: Feb. 1, 2018

(86) PCT No.: PCT/JP2018/003410
§ 371 (c)(1),
(2) Date: Jul. 30, 2019

(87) PCT Pub. No.: WO2018/143345
PCT Pub. Date: Aug. 9, 2018

(65) Prior Publication Data
US 2019/0356452 A1 Nov. 21, 2019

(30) Foreign Application Priority Data

Feb. 1, 2017 (JP) .................................. 2017-016697

(51) Int. Cl.
*H04L 5/00* (2006.01)
*H04W 24/10* (2009.01)

(52) U.S. Cl.
CPC ........... *H04L 5/0053* (2013.01); *H04W 24/10* (2013.01)

(58) Field of Classification Search
CPC ... H04L 5/0053; H04L 1/0026; H04L 1/0027; H04W 24/10; H04B 7/0626
See application file for complete search history.

(56) References Cited

U.S. PATENT DOCUMENTS 9,414,249 B2 8/2016 Hooli et al.
10,257,737 B2 4/2019 Lee et al.
(Continued)

FOREIGN PATENT DOCUMENTS

EP 2 624 473 A2 8/2013
EP 2 827 653 A1 1/2015
(Continued)

OTHER PUBLICATIONS

LG Electronics, "Discussion on remaining issues on PUSCH design for eMTC", 3GPP TSG RAN WG1 Meeting #83, R1-156842, Nov. 15-22, 2015, pp. 1-4.
(Continued)

*Primary Examiner* — Justin T Van Roie
(74) *Attorney, Agent, or Firm* — Keating & Bennett, LLP

(57) ABSTRACT

A terminal apparatus includes a transmitter configured to transmit, in a case that the aperiodic channel state information reporting and the periodic channel state information reporting occur in a same time period for a certain cell group, only an aperiodic channel state information report in the same time period, transmit, in a case that the semi-persistent channel state information reporting and the aperiodic channel state information reporting occur in a same time period for a certain cell group, only the aperiodic channel state information report in the same time period, and transmit, in a case that the periodic channel state information reporting and the semi-persistent channel state information reporting occur in a same time period for a certain cell
(Continued)

group, only a semi-persistent channel state information report in the same time duration.

6 Claims, 7 Drawing Sheets

(56) References Cited

U.S. PATENT DOCUMENTS

| | | | |
|---|---|---|---|
| 2013/0114554 A1 | 5/2013 | Yang et al. | |
| 2015/0049695 A1 | 2/2015 | Aiba et al. | |
| 2018/0062724 A1* | 3/2018 | Onggosanusi | H04B 7/0626 |
| 2019/0349052 A1* | 11/2019 | Yum | H04W 24/10 |
| 2019/0364546 A1* | 11/2019 | Kwak | H04L 5/0044 |

FOREIGN PATENT DOCUMENTS

| | | |
|---|---|---|
| EP | 3 200 557 A1 | 8/2017 |
| EP | 3 389 299 A1 | 10/2018 |
| WO | 2013/137319 A1 | 9/2013 |
| WO | 2016/093618 A1 | 6/2016 |

OTHER PUBLICATIONS

NTT Docomo, "Revision of SI: Study on New Radio Access Technology", 3GPP TSG RAN Meeting #72, RP-161214, Jun. 13-16, 2016, 8 pages.

Nokia et al., "Basic principles for the 5G New Radio access technology", 3GPP TSG-RAN WG1 #84bis, R1-162883, Apr. 11-15, 2016, 6 pages.

Intel Corporation, "Overview of antenna technology for new radio interface", 3GPP TSG-RAN WG1 #84bis, R1-162380, Apr. 11-15, 2016, pp. 1-3.

Ericsson, "Overview of NR", TSG-RAN WG1 #84bis, R1-163215, Apr. 11-15, 2016, 2 pages.

Huawei et al., "Uplink signaling enhancements in Rel-11 carrier aggregation", 3GPP TSG RAN WG1 Meeting #66, R1-112034, Aug. 22-26, 2011, 3 pages.

Intel Corporation, "Discussion on NR CSI configuration", 3GPP TSG-RAN WG1 #87, R1-1611984, Nov. 14-18, 2016, pp. 1-5.

* cited by examiner

BASE STATION APPARATUS, TERMINAL APPARATUS, COMMUNICATION METHOD, AND INTEGRATED CIRCUIT

TECHNICAL FIELD

The present invention relates to a base station apparatus, a terminal apparatus, a communication method, and an integrated circuit.

This application claims priority based on JP 2017-016697 filed in Japan on Feb. 1, 2017, the contents of which are incorporated herein by reference.

BACKGROUND ART

Currently, in the Third Generation Partnership Project (3GPP), technical studies and standard creation are being performed for Long Term Evolution (LTE)-Advanced Pro and New Radio technology (NR) and as radio access schemes and wireless network technologies for fifth generation cellular system (NPL 1).

In the 5th generation cellular system, three technologies are required for the expected service scenario, that is, enhanced Mobile BroadBand (eMBB) to realize a high-speed and high-capacity transmission, Ultra-Reliable and Low Latency Communication (URLLC) to realize a low delay and highly reliable communication, and massive Machine Type Communication (mMTC), such as Internet of Things (IoT), that allows a large number of machine type devices to be connected.

For the NR, technical studies are being performed for massive Multiple-Input Multiple-Output (MIMO) for ensuring coverage with a beamform gain by using multiple antenna elements at a high frequency (NPLs 2, 3, and 4).

CITATION LIST

Non Patent Literature

NPL 1: RP-161214, NTT DOCOMO, "Revision of SI: Study on New Radio Access Technology", June 2016
NPL 2: R1-162883, Nokia, Alcatel-Lucent Shanghai Bell, "Basic principles for the 5G New Radio access technology," April 2016
NPL 3: R1-162380, Intel Corporation, "Overview of antenna technology for new radio interface," April 2016
NPL 4: R1-163215, Ericsson, "Overview of NR," April 2016

SUMMARY OF INVENTION

Technical Problem

An object of some aspects of the present invention is to provide a terminal apparatus, a base station apparatus, a communication method, and an integrated circuit, where the base station apparatus and the terminal apparatus can efficiently communicate in the above-mentioned radio communication systems.

Solution to Problem (1) To accomplish the object described above, aspects of the present invention are contrived to provide the following measures. That is, a terminal apparatus according to an aspect of the present invention includes: a receiver configured to receive a radio resource control (RRC) message for configuring aperiodic channel state information reporting, periodic channel state information reporting, and/or semi-persistent channel state information reporting; and a transmitter configured to transmit a channel state information report. The transmitter transmits, in a case that the aperiodic channel state information reporting and the periodic channel state information reporting occur in a same time period for a certain cell group, only an aperiodic channel state information report in the same time period. The transmitter transmits, in a case that the semi-persistent channel state information reporting and the aperiodic channel state information reporting occur in a same time period for a certain cell group, only the aperiodic channel state information report in the same time period. The transmitter transmits, in a case that the periodic channel state information reporting and the semi-persistent channel state information reporting occur in a same time period for a certain cell group, only a semi-persistent channel state information report in the same time period.

(2) A base station apparatus according to an aspect of the present invention is a base station apparatus for communicating with a terminal apparatus, the base station apparatus including: a transmitter configured to transmit a radio resource control (RRC) message for configuring aperiodic channel state information reporting, periodic channel state information reporting, and/or semi-persistent channel state information reporting; and a receiver configured to receive a channel state information report. The receiver receives, in a case that the aperiodic channel state information reporting and the periodic channel state information reporting occur in a same time period for a certain cell group, only an aperiodic channel state information report in the same time period. The receiver receives, in a case that the semi-persistent channel state information reporting and the aperiodic channel state information reporting occur in a same time period for a certain cell group, only the aperiodic channel state information report in the same time period. The receiver receives, in a case that the periodic channel state information reporting and the semi-persistent channel state information reporting occur in a same time period for a certain cell group, only a semi-persistent channel state information report in the same time period.

(3) A communication method according to an aspect of the present invention is a communication method for a terminal apparatus for communicating with a base station apparatus, the communication method including: a receiver configured to receive a radio resource control (RRC) message for configuring aperiodic channel state information reporting, periodic channel state information reporting, and/or semi-persistent channel state information reporting; and a transmitter configured to transmit a channel state information report. The transmitter transmits, in a case that the aperiodic channel state information reporting and the periodic channel state information reporting occur in a same time period for a certain cell group, only an aperiodic channel state information report in the same time period. The transmitter transmits, in a case that the semi-persistent channel state information reporting and the aperiodic channel state information reporting occur in a same time period for a certain cell group, only the aperiodic channel state information report in the same time period. The transmitter transmits, in a case that the periodic channel state information reporting and the semi-persistent channel state information reporting occur in a same time period for a certain cell group, only a semi-persistent channel state information report in the same time period.

(4) A communication method according to an aspect of the present invention is a communication method for a base station apparatus for communicating with a terminal apparatus, the communication method including the steps of: transmitting a radio resource control (RRC) message for configuring aperiodic channel state information reporting, periodic channel state information reporting, and/or semi-persistent channel state information reporting; and receiving a channel state information report. In a case that the aperiodic channel state information reporting and the periodic channel state information reporting occur in a same time period for a certain cell group, only an aperiodic channel state information report is received in the same time period. In a case that the semi-persistent channel state information reporting and the aperiodic channel state information reporting occur in a same time period for a certain cell group, only the aperiodic channel state information report is received in the same time period. In a case that the periodic channel state information reporting and the semi-persistent channel state information reporting occur in a same time period for a certain cell group, only a semi-persistent channel state information report is received in the same time period.

(5) An integrated circuit according to an aspect of the present invention is an integrated circuit implemented in a terminal apparatus for communicating with a base station apparatus, the integrated circuit including: a receiver configured to receive a radio resource control (RRC) message for configuring aperiodic channel state information reporting, periodic channel state information reporting, and/or semi-persistent channel state information reporting; and a transmitter configured to transmit a channel state information report. The transmitter transmits, in a case that the aperiodic channel state information reporting and the periodic channel state information reporting occur in a same time period for a certain cell group, only an aperiodic channel state information report in the same time period. The transmitter transmits, in a case that the semi-persistent channel state information reporting and the aperiodic channel state information reporting occur in a same time period for a certain cell group, only the aperiodic channel state information report in the same time period. The transmitter transmits, in a case that the periodic channel state information reporting and the semi-persistent channel state information reporting occur in a same time period for a certain cell group, only a semi-persistent channel state information report in the same time period.

(6) An integrated circuit according to an aspect of the present invention is an integrated circuit implemented in a base station apparatus for communicating with a terminal apparatus, the integrated circuit including: a transmitter configured to transmit a radio resource control (RRC) message for configuring aperiodic channel state information reporting, periodic channel state information reporting, and/or semi-persistent channel state information reporting; and a receiver configured to receive a channel state information report. The receiver receives, in a case that the aperiodic channel state information reporting and the periodic channel state information reporting occur in a same time period for a certain cell group, only an aperiodic channel state information report in the same time period. The receiver receives, in a case that the semi-persistent channel state information reporting and the aperiodic channel state information reporting occur in a same time period for a certain cell group, only the aperiodic channel state information report in the same time period. The receiver receives, in a case that the periodic channel state information reporting and the semi-persistent channel state information reporting occur in a same time period for a certain cell group, only a semi-persistent channel state information report in the same time period.

Advantageous Effects of Invention

According to one aspect of the present invention, a base station apparatus and a terminal apparatus can efficiently communicate with each other.

DESCRIPTION OF EMBODIMENTS

Embodiments of the present invention will be described below.

Figure 1:
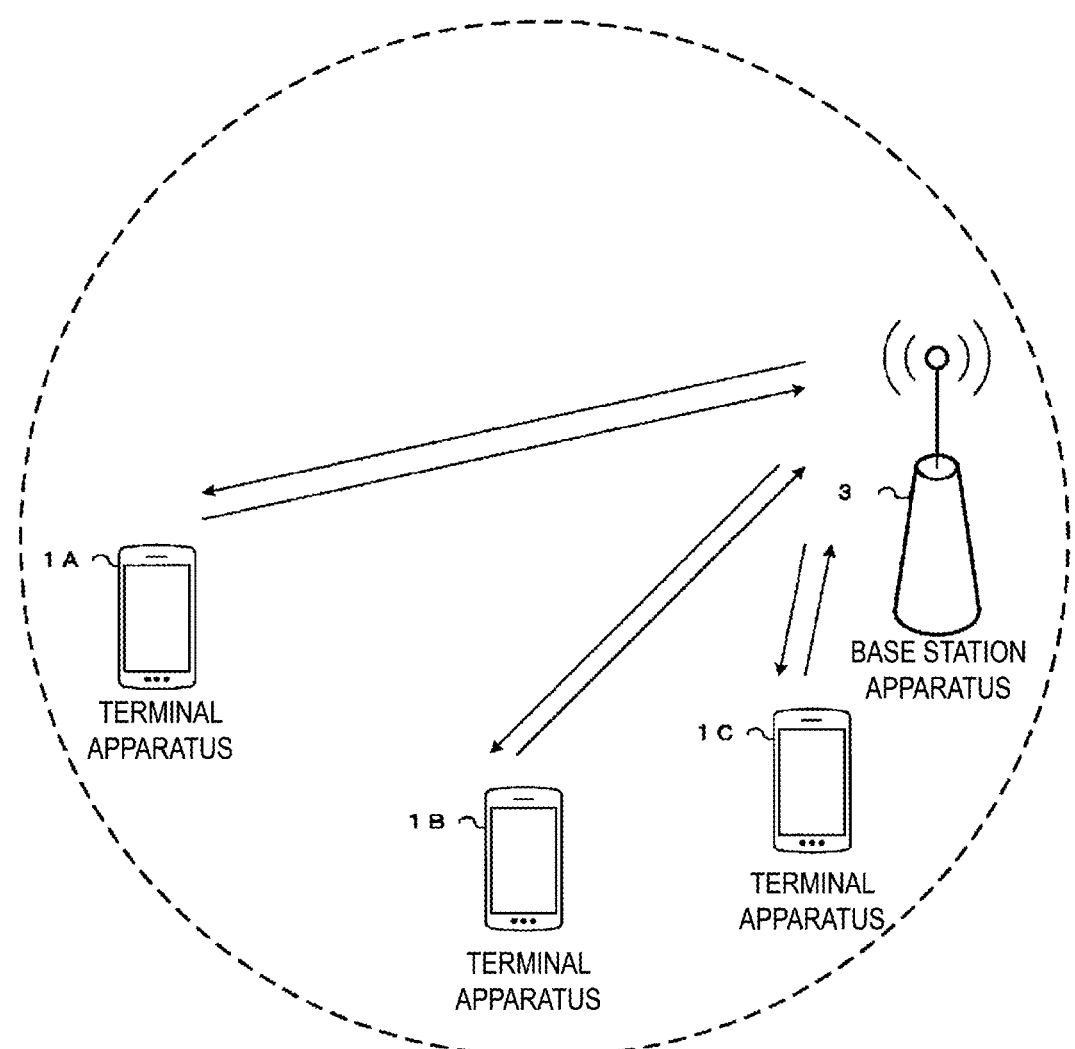
FIG. 1 is a diagram illustrating a concept of a radio communication system according to the present embodiment.

FIG. 1 is a conceptual diagram of a radio communication system according to the present embodiment. In FIG. 1, a radio communication system includes terminal apparatuses 1A to 1C and a base station apparatus 3. Hereinafter, the terminal apparatuses 1A to 1C are each also referred to as a terminal apparatus 1.

The terminal apparatus 1 is also called a user terminal, a mobile station device, a communication terminal, a mobile device, a terminal, User Equipment (UE), and a Mobile Station (MS). The base station apparatus 3 is also called a radio base station apparatus, a base station, a radio base station, a fixed station, a NodeB (NB), an evolved NodeB (eNB), a Base Transceiver Station (BTS), a Base Station (BS), an NR NodeB (NR NB), an NNB, a Transmission and Reception Point (TRP), and a gNB.

In FIG. 1, Orthogonal Frequency Division Multiplexing (OFDM) including Cyclic Prefix (CP), Single Carrier Frequency Division Multiplexing (SC-FDM), Discrete Fourier Transform Spread OFDM (DFT-S-OFDM), and Multi-Carrier Code Division Multiplexing (MC-CDM) may be employed for radio communication between the terminal apparatus 1 and the base station apparatus 3.

In FIG. 1, in the radio communication between the terminal apparatus 1 and the base station apparatus 3, Universal-Filtered Multi-Carrier (UFMC), Filtered OFDM (F-OFDM), OFDM in which a window is multiplied (Windowed OFDM), and Filter-Bank Multi-Carrier (FBMC) may be used.

Note that the present embodiment will be described by using OFDM symbol with the assumption that a transmission scheme is OFDM, and use of any other transmission scheme is also included in an aspect of the present invention.

In FIG. 1, the aforementioned transmission scheme that uses no CP or uses zero padding instead of the CP may be employed for the radio communications between the terminal apparatus 1 and the base station apparatus 3. Further, the CP and the zero padding may be added both forward and backward.

In FIG. 1, Orthogonal Frequency Division Multiplexing (OFDM) including Cyclic Prefix (CP), Single Carrier Frequency Division Multiplexing (SC-FDM), Discrete Fourier Transform Spread OFDM (DFT-S-OFDM), and Multi-Carrier Code Division Multiplexing (MC-CDM) may be employed for radio communication between the terminal apparatus 1 and the base station apparatus 3.

In FIG. 1, the following physical channels are used for radio communication between the terminal apparatus 1 and the base station apparatus 3.

Physical Broadcast CHannel (PBCH)
Physical Control CHannel (PCCH)
Physical Shared CHannel (PSCH)

The PBCH is used for the base station apparatus 3 to broadcast an important information block (Master Information Block: MIB, Essential Information Block: EIB) including important system information required by the terminal apparatus 1.

In a case of uplink radio communication (radio communication from the terminal apparatus 1 to the base station apparatus 3), the PCCH is used to transmit Uplink Control Information (UCI). Here, the uplink control information may include Channel State Information (CSI) used to indicate a downlink channel state. The uplink control information may include Scheduling Request (SR) used to request an UL-SCH resource. The uplink control information may include Hybrid Automatic Repeat reQuest ACKnowledgment (HARQ-ACK). The HARQ-ACK may indicate HARQ-ACK for downlink data (Transport block, Medium Access Control Protocol Data Unit (MAC PDU), Downlink-Shared Channel (DL-SCH)).

Furthermore, in a case of downlink radio communication (radio communication from the base station apparatus 3 to the terminal apparatus 1), it is used to transmit Downlink Control Information (DCI). Here, one or more DCIs (which may be referred to as DCI formats) are defined for transmission of the Downlink Control Information. That is, a field for the Downlink Control Information is defined as the DCI, and is mapped to information bits.

For example, DCI including information for indicating whether a signal included in the scheduled PSCH is a downlink radio communication or uplink radio communication may be defined.

For example, DCI including information for indicating a downlink transmission period included in the scheduled PSCH may be defined.

For example, DCI including information for indicating an uplink transmission period included in the scheduled PSCH may be defined.

For example, DCI including information for indicating a timing for transmitting HARQ-ACK for the scheduled PSCH (for example, the number of symbols from the last symbol included in the PSCH to the HARQ-ACK transmission) may be defined.

For example, DCI including information for indicating a downlink transmission period, a gap, and an uplink transmission period that are included in the scheduled PSCH may be defined.

For example, DCI to be used for scheduling a PSCH for downlink radio communication in one cell (transmission of one downlink transport block) may be defined.

For example, DCI to be used for scheduling a PSCH for uplink radio communication in one cell (transmission of one uplink transport block) may be defined.

Here, information on scheduling of the PSCH is included in the DCI in a case that an uplink or a downlink is included in the PSCH. Here, the DCI for the downlink is also referred to as downlink grant or downlink assignment. Here, the DCI for the uplink is also referred to as uplink grant or Uplink assignment.

The PSCH is used to transmit uplink data (Uplink Shared CHannel: UL-SCH) or downlink data (Downlink Shared CHannel: DL-SCH) from Medium Access Control (MAC). In a case of the downlink, the PSCH is also used to transmit System Information (SI) and Random Access Response (RAR). In a case of the uplink, the PSCH may be used to transmit HARQ-ACK and/or CSI, together with the uplink data. Furthermore, the PSCH may be used to transmit CSI only or HARQ-ACK and CSI only. That is, the PSCH may be used to transmit UCI only.

Here, the base station apparatus 3 and the terminal apparatus 1 exchange (transmit and/or receive) signals with each other in their respective higher layers. For example, the base station apparatus 3 and the terminal apparatus 1 may transmit and receive radio resource control (RRC) signaling (also referred to as RRC message or RRC information) in the RRC layer, respectively. The base station apparatus 3 and the terminal apparatus 1 may transmit and receive a Medium Access Control (MAC) control element in a MAC layer, respectively. Here, the RRC signaling and/or the MAC control element is also referred to as higher layer signaling.

The PSCH may be used to transmit the RRC signaling and the MAC control element. Here, the RRC signaling transmitted from the base station apparatus 3 may be signaling common to multiple terminal apparatuses 1 in a cell. The RRC signaling transmitted from the base station apparatus 3 may be signaling dedicated to a certain terminal apparatus 1 (also referred to as dedicated signaling). In other words, terminal apparatus-specific (UE-specific) information may be transmitted through signaling dedicated to the certain terminal apparatus 1. The PSCH may be used to transmit UE Capability in the uplink.

Although the names PCCH and PSCH are consistently used for both the downlink and uplink, different channels may be defined for the downlink and uplink.

For example, a shared channel in the downlink may be referred to as a Physical Downlink Shared CHannel (PDSCH). A shared channel in the uplink may be referred to as a Physical Uplink Shared CHannel (PUSCH). A control channel in the downlink may be referred to as a Physical Downlink Control CHannel (PDCCH). A control channel in the uplink may be referred to as a Physical Uplink Control CHannel (PUCCH).

In FIG. 1, the following downlink physical signals are used for downlink radio communication. Here, the downlink physical signals are not used to transmit the information output from the higher layers but is used by the physical layer.

Synchronization Signal (SS)
Reference Signal (RS)

The synchronization signal may include a Primary Synchronization Signal (PSS) and a Second Synchronization Signal (SSS). The PSS and the SSS may be used to detect a cell ID.

The synchronization signal is used for the terminal apparatus 1 to take synchronization in the frequency domain and the time domain in the downlink. Furthermore, the synchronization signal may be used for the terminal apparatus 1 to perform a selection regarding the precoding by the base station apparatus 3 or a selection regarding the precoding or beam in the beamforming.

The reference signal is used for the terminal apparatus 1 to perform channel compensation on a physical channel. The reference signal may be used in order for the terminal apparatus 1 to obtain the downlink CSI. In addition, the reference signal may be used for fine synchronization the level of which is enough to perform window synchronization, for numerology such as a radio parameter or a subcarrier spacing, or the like or for FFT.

According to the present embodiment, any one or a plurality of the following downlink reference signals is used.

Demodulation reference signal (DMRS)
Channel State Information-Reference Signal (CSI-RS)
Phase Tracking Reference Signal (PTRS)
Mobility Reference Signal (MRS)

The DMRS is used to demodulate a modulated signal. Note that two types of reference signals, including one for demodulating PBCH and one for demodulating PSCH may be defined as the DMSR, or both of these may be referred to as the DMRS. The CSI-RS is used to measure Channel State Information (CSI) and to perform beam management. The PTRS is used to track the phase in response to a movement of the terminal and the like. The MRS may be used to measure reception quality from multiple base station apparatuses for handovers. The reference signals may further include a reference signal defined for compensating for phase noise.

The downlink physical channels and/or the downlink physical signals are collectively referred to as a downlink signal. The uplink physical channels and/or the uplink physical signals are collectively referred to as an uplink signal. The downlink physical channels and/or the uplink physical channels are collectively referred to as a physical channel. The downlink physical signals and/or the uplink physical signals are collectively referred to as a physical signal.

The BCH, the UL-SCH, and the DL-SCH are transport channels. A channel used in a Medium Access Control (MAC) layer is referred to as a transport channel. A unit of the transport channel used in the MAC layer is also referred to as a Transport Block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

The reference signal may also be used to perform Radio Resource Measurement (RRM). The reference signal may also be used to perform beam management.

The beam management may be a procedure performed in the base station apparatus 3 and/or the terminal apparatus 1 so that a beam gain can be obtained with the directivity of an analog and/or digital beam of a transmission apparatus (the base station apparatus 3 in the case of the downlink, and the terminal apparatus 1 in the case of the uplink) matching the directivity of an analog and/or digital beam of a reception apparatus (the terminal apparatus 1 in the case of the downlink and the base station apparatus 3 in the case of the uplink).

Note that the beam management may include the following procedures.

Beam selection
Beam refinement
Beam recovery

For example, the beam selection may be a procedure for selecting a beam in communications between the base station apparatus 3 and the terminal apparatus 1. The beam refinement may be a procedure of selecting a beam with a higher gain or of changing a beam between the optimal base station apparatus 3 and the terminal apparatus 1 in response to a movement of the terminal apparatus 1. The beam recovery may be a procedure of re-selecting a beam in response to a reduction of the quality of the communication link due to a blockage caused by a blocking body, human passage, or the like in communications between the base station apparatus 3 and the terminal apparatus 1.

For example, in the terminal apparatus 1, the CSI-RS or Quasi Co-Location (QCL) assumption may be used for selecting the transmission beam of the base station apparatus 3.

In a case that Long Term Property of a channel on which a symbol on an antenna port can be estimated from a channel on which a symbol on another antenna port is carried, the two antenna ports are said to be quasi co-located (in a QCL state). The long term property includes one or a plurality of delay spread, Doppler spread, Doppler shift, average gain, and average delay. For example, in a case that an antenna port 1 and an antenna port 2 are in the QCL state in terms of average delay, the reception timing of the antenna port 2 may be inferred from the reception timing of the antenna port 1.

The QCL may also be expanded to beam management. Thus, spatially expanded QCL may be newly defined. Examples of the Long Term Property of a channel in spatial QCL assumption may include an Angle of Arrival (AoA) or a Zenith angle of Arrival (ZoA), an Angle Spread (an Angle Spread of Arrival (ASA) or a Zenith angle Spread of Arrival (ZSA) for example), an Angle of Delivery (AoD or ZoD for example) and their Angle Spreads (for example, Angle Spread of Departure (ASD), Zenith angle Spread of Departure (ZSS)), and Spatial Correlation in a wireless link or a channel.

Thus, an operation of the base station apparatus 3 and the terminal apparatus 1 equivalent to the beam management based on spatial QCL assumption and wireless resource (time and/or frequency) may be defined as the beam management.

The subframe will be described below. The subframe in the embodiment may also be referred to as a resource unit, a radio frame, a time period, or a time period.

Figure 2:
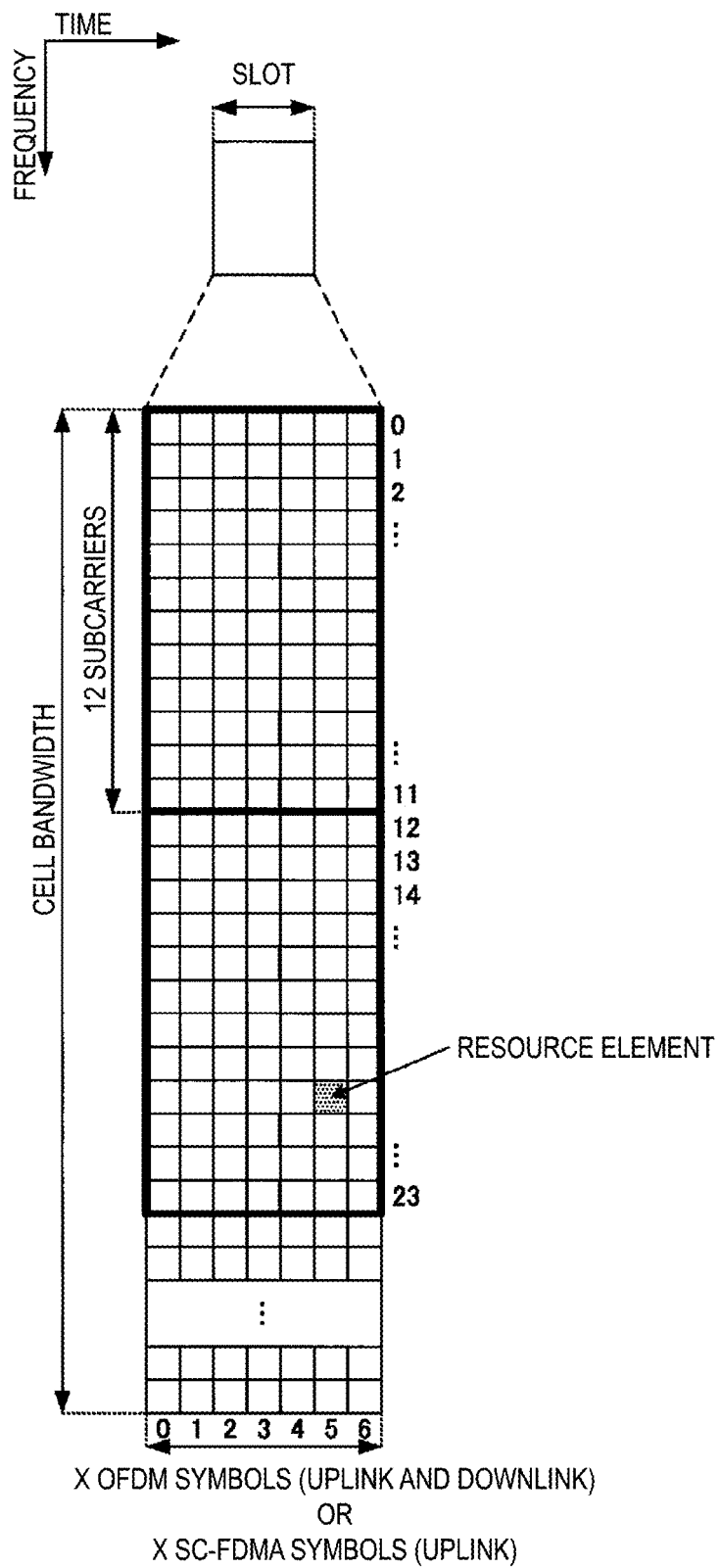
FIG. 2 is a diagram illustrating an example of a schematic configuration of a downlink slot according to the present embodiment.

FIG. 2 is a diagram illustrating a schematic configuration of a downlink slot according to a first embodiment of the present invention. Each of the radio frames is 10 ms in length. Each of the radio frames includes 10 subframes and X slots. In other words, each subframe has a length of 1 ms. The time length of each of the slots is defined by subcarrier spacing. For example, in a case of Normal Cyclic Prefix (NCP) with the subcarrier spacing of OFDM symbols being 15 kHz, X is 7 or 14 respectively corresponding to 0.5 ms or 1 ms. In addition, in a case that the subcarrier spacing is 60 kHz, X is 7 or 14 respectively corresponding to 0.125 ms or 0.25 ms. FIG. 2 illustrates an example of a case where X is 7. Note that the case can be similarly extended to a case where X is 14. The uplink slot may be defined similarly, and the downlink slot and the uplink slot may be defined separately from one another.

The signal or the physical channel transmitted in each of the slots may be expressed by a resource grid. The resource grid is defined by a plurality of subcarriers and a plurality of OFDM symbols. The number of subcarriers constituting one slot depends on a cell bandwidth of a cell in each of the downlink and the uplink. Each element within the resource grid is referred to as a resource element. The resource element may be identified by a subcarrier number and an OFDM symbol number.

A resource block is used to express mapping of a certain physical downlink channel (such as the PDSCH) or a certain physical uplink channel (such as the PUSCH) to resource elements. For the resource block, a virtual resource block and a physical resource block are defined. A certain physical uplink channel is first mapped to a virtual resource block. Thereafter, the virtual resource block is mapped to the physical resource block. In the case of NCP with the number of OFDM symbols being X=7, one physical resource block is defined by seven consecutive OFDM symbols in the time domain and by 12 consecutive subcarriers in the frequency domain. Hence, one physical resource block includes (7×12) resource elements. In a case of Extended CP (ECP), one physical resource block is defined by six consecutive OFDM symbols in the time domain and by 12 consecutive subcarriers in the frequency domain. Hence, one physical resource block includes (6×12) resource elements. Furthermore, one physical resource block corresponds to one slot in the time domain and corresponds to 180 kHz in the frequency domain in a case that the subcarrier spacing is 15 kHz (720 kHz in a case that the subcarrier spacing is 60 kHz). Physical resource blocks are numbered from 0 in the frequency domain.

Figure 3:
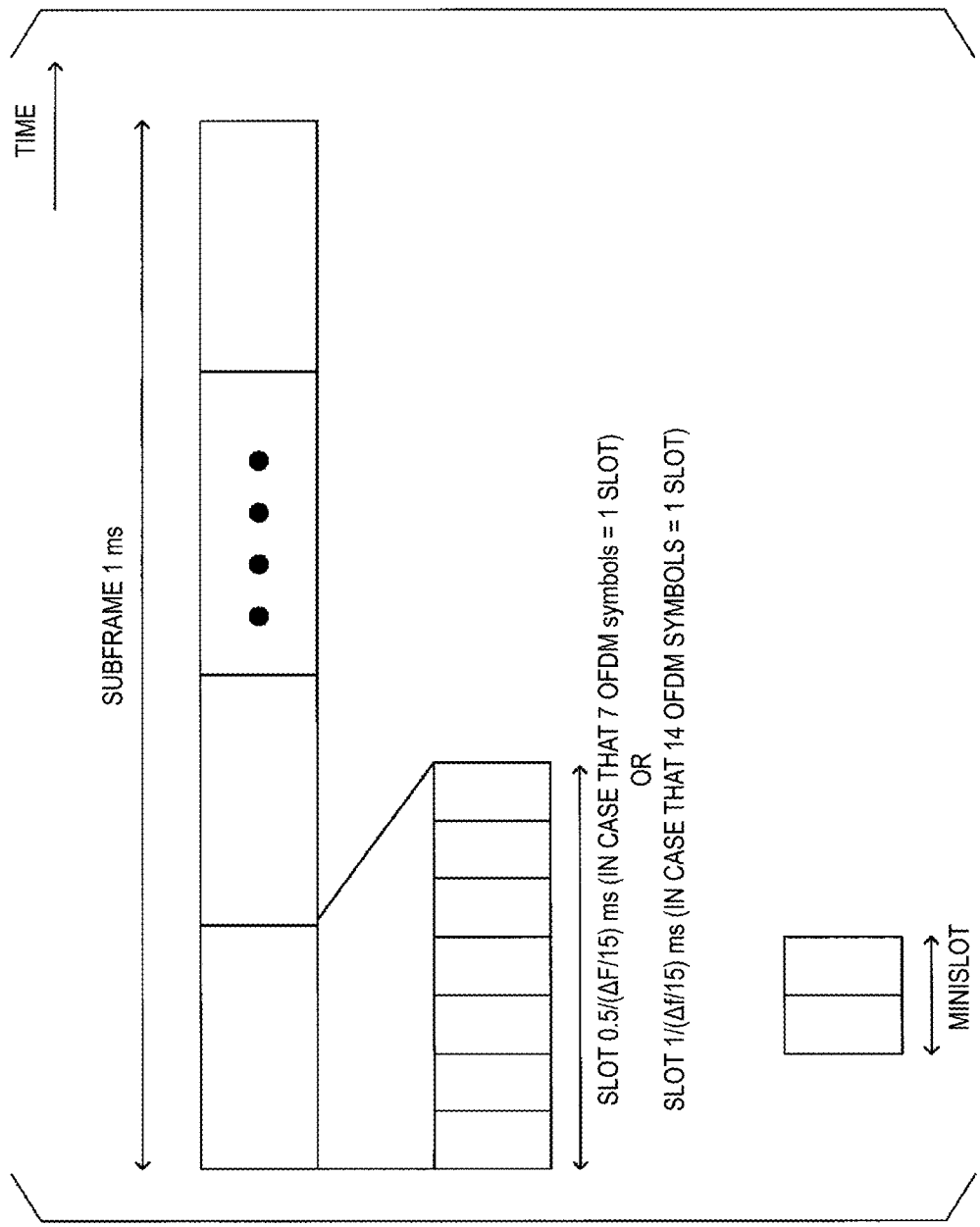
FIG. 3 is a diagram illustrating a relationship among a subframe, a slot, and a mini-slot in a time domain.

Next, a subframe, a slot, and a mini-slot will be described. FIG. 3 is a diagram illustrating a relationship among a subframe, a slot, and a mini-slot in a time domain. As illustrated in the figure, three types of time units are defined. The subframe is 1 ms regardless of the subcarrier spacing, whereas the slot includes 7 or 14 OFDM symbols and has a slot length depending on the subcarrier spacing. Specifically, in a case that the subcarrier spacing is 15 kHz, a single subframe includes 14 OFDM symbols. Thus, in a case that the subcarrier spacing is $\Delta f$ (kHz), the slot length may be defined as $0.5/(\Delta f/15)$ ms in a case where a single slot includes seven OFDM symbols. This $\Delta f$ may be defined by subcarrier spacing (kHz). The slot length may be defined as $1/(\Delta f/15)$ ms in a case where a single slot includes seven OFDM symbols. This $\Delta f$ may be defined by subcarrier spacing (kHz). Furthermore, the slot length may be defined as $X/14/(\Delta f/15)$ ms, where X is the number of OFDM symbols in a slot.

Figure 4:
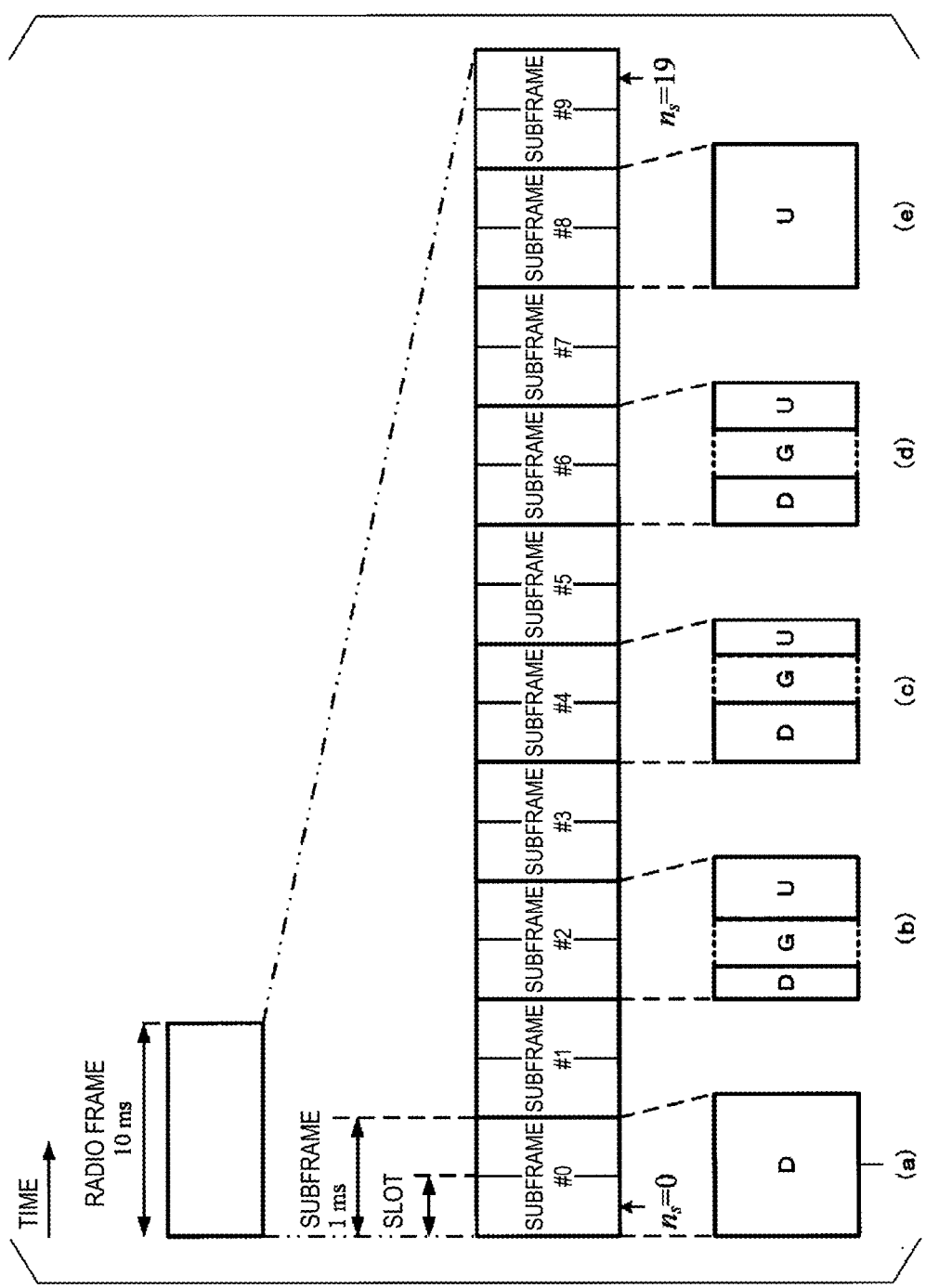
FIG. 4 is a diagram illustrating an example of the slot or the subframe.

The mini-slot (which may be referred to as a sub-slot) is a time unit including OFDM symbols that are less than the number of OFDM symbols included in the slot. The figure illustrates an example of a case where the mini-slot includes 2 OFDM symbols. The OFDM symbols in the mini-slot and the OFDM symbols in the slot may match in timing. Note that a slot or mini-slot may be the minimum scheduling unit. Also, FIG. 4 is a diagram illustrating an example of a slot or a subframe. Here, an example of a case is illustrated in which the slot length is 0.5 ms with the subcarrier interval being 15 kHz. In the figure, D represents the downlink, and U represents the uplink. As illustrated in the figure, during a certain time period (for example, the minimum time period to be allocated to an UE in the system), the subframe may include one or more of the followings:

a downlink part (duration);
the gap
an uplink part (duration).

Part (a) of FIG. 4 illustrates an example in which the entire subframe is used for downlink transmission during a certain time period (for example, a minimum time resource unit that can be allocated to a UE, which may also be referred to as a time unit. Furthermore, a combination of a plurality of minimum time resource units may be referred to as a time unit). Part (b) of FIG. 4 illustrates an example in which an uplink is scheduled via a PCCH for example by using the first time resource, and an uplink signal is transmitted after a gap for a processing delay of the PCCH, a time for switching from a downlink to an uplink, and generation of a transmit signal. Part (c) of FIG. 4 illustrates an example in which a downlink PCCH and/or downlink PSCH are transmitted by using the first time resource, and a PSCH or PCCH is transmitted after a gap for a processing delay, a time for switching from a downlink to an uplink, and generation of a transmit signal. Here, for example, the uplink signal may be used to transmit the HARQ-ACK and/or CSI, namely, the UCI. Part (d) of FIG. 4 illustrates an example in which a downlink PCCH and/or a downlink PSCH are transmitted by using the first time resource, and a PSCH or PCCH is transmitted after a gap for a processing delay, a time for switching from a downlink to an uplink, and generation of a transmit signal. Here, for example, the uplink signal may be used to transmit the uplink data, namely, the UL-SCH. Part (e) of FIG. 4 illustrates an example in which the entire subframe is used for uplink transmission (uplink PSCH or PCCH).

The above-described downlink part and uplink part may include multiple OFDM symbols as is the case with LTE.

Figure 5:
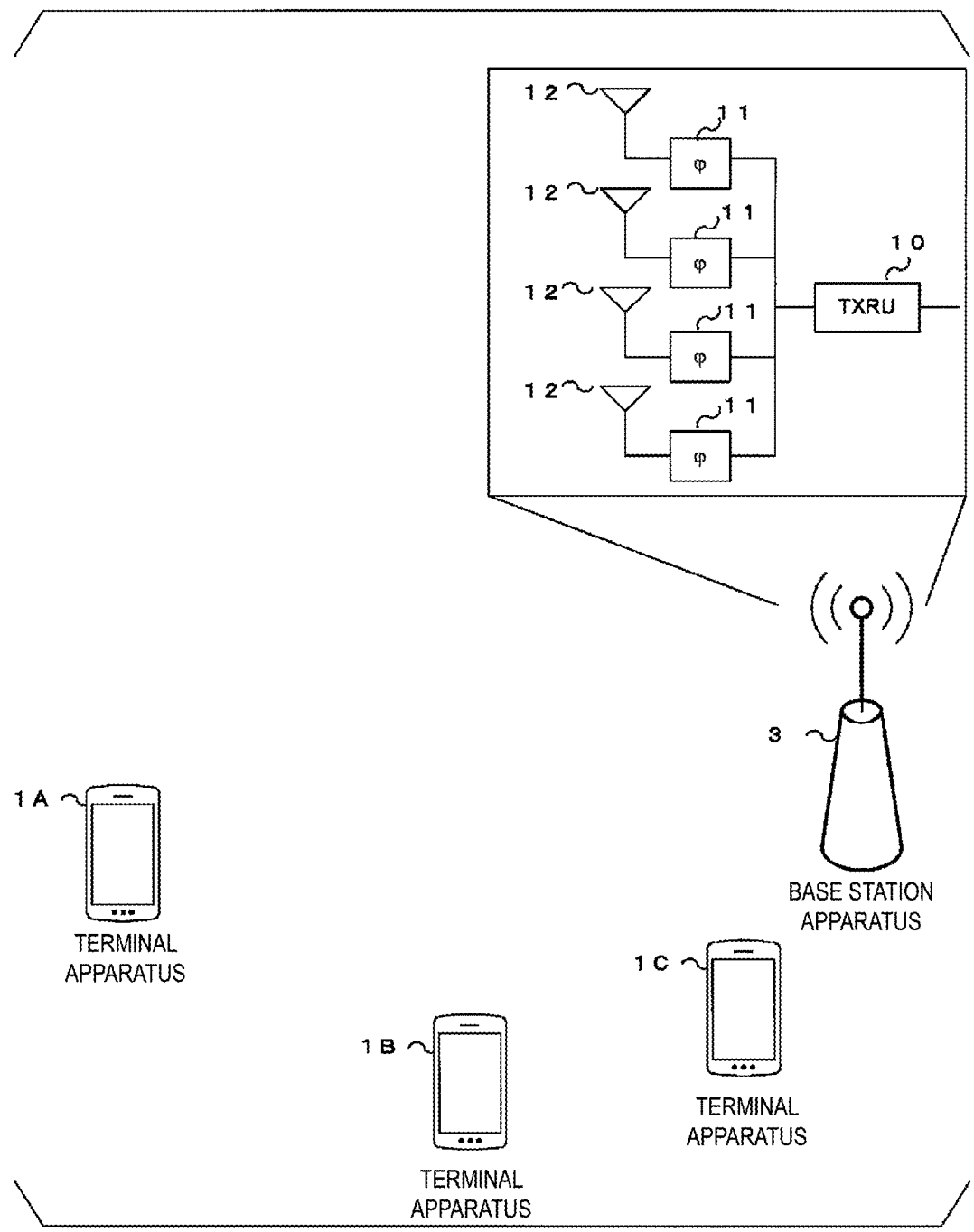
FIG. 5 is a diagram illustrating an example of beam forming.

FIG. 5 illustrates an example of the beamforming. A plurality of antenna elements are connected to a single transmitter (Transceiver unit (TXRU)) 10, and a beam can be directed to a desired direction for a transmission signal with the antenna elements 12 performing transmission with a phase shifter 11 of each of the antenna elements performing phase control. Typically, the TXRU may be defined as an antenna port, and only the antenna port may be defined in the terminal apparatus 1. The directivity in a desired direction can be obtained by controlling the phase shifter 11, whereby the base station apparatus 3 can communicate with the terminal apparatus 1 using a beam with a high gain.

The terminal apparatus 3 performs measurements (e.g., RRM measurements) on the RRC layer to measure the quality of the radio link. The terminal apparatus 3 performs CSI measurement on the physical layer. The terminal apparatus 3 transmits a measurement report on the RRC layer using the RRC layer, and transmits the CSI report on the physical layer using the physical layer.

The CSI report is for reporting the CSI, measured by the terminal apparatus 1, to the base station apparatus 3 in the case of a downlink. To enable this, the base station apparatus 3 configures one or a plurality of CSI report setting(s) for the terminal apparatus 1. The CSI Report setting may include the following settings.

Operation in time direction operation (transmission method)
Granularity in frequency domain
CSI Type The operation in the time direction may indicate a method for transmitting a reference signal such as aperiodic (which may also be referred to as one-shot), a semi-persistent, and a Periodic transmission methods.

The granularity in the frequency domain may be, for example, the granularity in the calculation for PMI and CQI. For example, it may indicate that one wide band PMI and wide band CQI corresponds to all resource blocks included in the measured bandwidth. For example, it may indicate the number of resource blocks (the number of resource blocks in a partial band and/or a resource block group) involved in the measurement of the sub-band narrower than the measured band and/or sub-band PMI and/or the partial band CQI.

The CSI type may indicate a type of CSI to be reported which may be, for example, any one CSI or a plurality of CSI among CQI/PMI/RI/CRI. Additionally, the CSI type may indicate a type of CSI of whether CSI (type 1) including PMI represented by a codebook is fed back, or expanded CSI (type 2) such as an analog feedback, a more granular codebook and/or a channel matrix and/or a channel covariance matrix.

An RS (e.g., CSI-RS) is assumed to be used as the reference signal for measuring CSI. Thus, the base station apparatus 3 configures one or a plurality of RS setting(s) for the terminal apparatus 1. The RS setting may include the following settings.

Operation in time direction operation (transmission method)
Resource
Reference signal type The operation in the time direction may indicate a method for transmitting a reference signal such as an aperiodic, a semi-persistent, and a Periodic transmission methods.

The resource may indicate a resource element and/or OFDM symbol mapped in time and/or frequency. In addition, in the case of the semi-persistent or periodic transmission, it may indicate a period and a CSI-R transmission interval (e.g., in milliseconds, slot units, OFDM symbol units, or the like). Note that the CSI-RS resources may be indicated by an index (or identity) with these information mapped.

Note that a configuration of any one of the RS settings may include the cycle, subframe offset and/or the slot offset of the reference signal that may be potentially transmitted in any of periodic, semi-persistent, and aperiodic transmissions.

The reference signal type may indicate, for example, whether a reference signal other than CSI-RS (e.g., DMRS) is used as a reference signal for CSI measurement. Of course, this setting needs not to be included in a case that only the CSI-RS is used as a reference signal for the CSI.

For the CSI measurement, the terminal apparatus 1 is used to measure CSI. Thus, the base station apparatus 3 configures one or a plurality of CSI measurement settings(s) for the terminal apparatus 1. The CSI measurement setting may include the following settings.

Setting on one CSI report (one of the one or a plurality of CSI report settings or an index indicating the setting)
One RS setting (one of the one or a plurality of RS settings or an index indicating the setting)
Reference transmission mode One CSI report setting may indicate, in a CSI measurement setting, a setting for reporting CSI measured using a CSI measurement setting or an index indicating the CSI report setting.

One RS setting may indicate, in a CSI setting, a setting on a reference signal used for setting a CSI measurement or an index indicating the setting.

The CSI report setting may be a setting for associating the index of one CSI report setting with indices of the CSI report setting in the CSI report setting and of the RS setting.

The reference transmission mode may indicate a transmission mode and/or MIMO mode assumed for CSI measurement in a setting for the CSI measurement. For example, the transmission mode may be a wireless transmission mode such as an OFDM mode and/or a DFT-S-OFDM mode. The MIMO mode may be a multi-antenna transmission mode such as, for example, transmission diversity, closed loop MIMO, open loop MIMO, and semi-open loop MIMO. Only one of these may serve as the reference transmission mode. A combination of these may serve as a single reference transmission mode.

Moreover, a plurality of CSI processes for measuring CSI may be configured for the terminal apparatus 1. In such a case, one CSI process may be associated with one RS setting. One CSI process may be associated with one CSI report setting.

As described above, in a case that the reference signal is activated in the MAC layer for one RS setting, the base station apparatus 3 transmits a reference signal based on the RS setting, and the terminal apparatus 1 recognizes (assumes) that the reference signal based on the RS setting that has been activated has been transmitted. In a period in which the reference signal is activated, the terminal apparatus 1 receives the reference signal for the time/frequency resource of the reference signal configured by the RS setting.

For example, it is assumed that for the CSI-RS resource included in the RS setting, a period of 5 ms, a subframe offset (or a slot offset) of 0, and the time/frequency resource to which the CSI-RS is allocated is configured in the fourth subcarrier of the resource block of the sixth OFDM symbol of each subframe.

In this case, the potential resource to which the CSI-RS is allocated based on the radio frame number is a subframe {0, 5, 10, . . . }. Here, in a case that CSI-RS is activated in the MAC layer in a subframe 3, it is assumed that there is CSI-RS in the radio resource configured by the RS setting until the CSI-RS is deactivated in the subframe 3 and subsequent. The terminal apparatus receives CSI-RS allocated to the fourth subcarrier in the resource block of the fourth OFDM symbol in the subframes 5, 10, . . . after the reference signal has been activated.

Here, in a case that the reference signal configured by the RS setting is activated, the terminal apparatus 1 assumes that the reference signal configured by the RS setting has been activated. For example, in a case that the reference signal is CSI-RS and the CSI-RS is activated in a subframe n, PDSCH is not mapped to a resource element assumed by the terminal apparatus 1, used for transmission of the CSI-RS based on the RS setting, until the reference signal is deactivated in or after the subframe n. On the other hand, PDSCH is mapped to a potential resource element to be used by the terminal apparatus 1 for the CSI-RS based on the potential RS setting before the subframe n or after the deactivation.

In a case that coordinated communications are performed with the plurality of base station apparatuses 3 or TRP, the reference signal is individually configured for each radio link (a plurality of CSI processes, a plurality of CSI measurement settings or a plurality of RS settings are configured for the terminal apparatus 1). The resource elements to which the PDSCH is mapped may be separately signaled. For example, in a case that a CSI-RS setting is included in the information on the PDSCH resource element mapping in DCI, PDSCH is not mapped to the resource element assumed to be used for the CSI-RS transmission with the reference signal for the RS setting activated. Of course, the coordinated communication is an example and should not be construed in a limiting sense.

Activation may be performed based on the RRC setting, in a case that RRC is configured, and/or in a case that a MAC command is received. For example, in a case that the RS setting of RRC includes "periodic", the corresponding CSI-RS may be activated in response to reception of the RRC message.

In a case that the reference signal configured by the RS setting is triggered by DCI, PDSCH is not mapped to the resource element assumed to be used for transmission of the reference signal configured by the RS setting.

How the base station apparatus 3 configures an RS for the CSI report for the terminal apparatus 1 will be described. With an index of the RS setting included in the CSI measurement setting, a corresponding RS setting can be identified, and the channel measurement can be generated based on the RS setting.

In a case that the transmission method in the RS setting configured with the RS setting is "periodic", the channel measurement is generated based on the RS setting at the time when the RS setting is configured.

In a case that the transmission method in the RS setting is "semi-persistent", the terminal apparatus 1 may receive, in a period between activation of the reference signal with the RS setting configured and deactivation of the reference signal, the reference signal configured by the RS setting based on the RS setting.

Here, the activation of the reference signal may mean that the terminal apparatus 1 recognizes that the reference signal is provided to the resource element based on the RS setting. For the activation, the base station apparatus 3 may activate the reference signal in the MAC layer for the terminal apparatus 1, and the information for activating the reference signal may be included in the MAC control element or the MAC protocol data unit. The terminal apparatus 3 preforms reception in the MAC layer, and receives a reference signal based on the RS setting after T (ms). The deactivation may be indicated in the MAC layer. As another example of deactivation, instead of indicating deactivation signaling in the MAC layer, a reference signal of the resource element based on the RS setting may be received for a predetermined or configured time. Note that T described above may be included in the RS setting or may be predefined. In addition, in a case that the time until the reference signal is deactivated in the MAC layer is preset, it may be included in the RS setting.

Here, one or a plurality of indices of the RS setting associated with the reference signal to be activated may be included as information about the MAC layer for activating and/or deactivating the reference signal. For example, in a case that one or a plurality of RS settings are triggered in MAC layers, the RS setting with which the reference signal is activated may be indicated by a bitmap or may be collectively coded. A bit in each field corresponds to an index of each RS setting, and the reference signal corresponding to the field in which 1 is set is activated. The reference signal corresponding to the field in which 0 is set is deactivated.

One or a plurality of indices for one or a plurality of CSI measurements may be included as information about the MAC layer for activating and/or deactivating the reference signal. For example, in a case that one or a plurality of CSI measurement settings are triggered in the MAC layer, the CSI measurement setting with which the CSI measurement is activated may be indicated by a bitmap or may be collectively coded. A bit in each field corresponds to an index of each CSI measurement, and the CSI measurement corresponding to the field in which 1 is set is activated. The CSI measurement corresponding to the field in which 0 is set is deactivated.

In a case that the transmission method in the RS setting is "semi-persistent", reception of the reference signal by the terminal apparatus 1 may be triggered with DCI. Here, a reference signal configured by an RS setting may be received based on the RS setting, in a subframe indicated by the DCI or after. The DCI may indicate to the terminal apparatus 1 to terminate the reception of the reference signal. The DCI may include an index of one or a plurality of CSI measurements configured by the CSI measurement setting. Thus, the reception of the reference signal and the CSI measurement can be efficiently implemented.

In a case that the transmission method in the RS setting is "aperiodic", a trigger for the reception of the reference signal may be received by the terminal apparatus 1 with the DCI. Here, a reference signal configured by an RS setting may be received once or a plurality of times based on the RS setting, in the subframe designated by the DCI or with the first reference signal resource after the designated subframe. The DCI may include an index of one or a plurality of CSI measurements configured. Information, included in the DCI, indicating which CSI measurement setting is triggered may be indicated by a bitmap, or may be collectively coded.

How the base station apparatus 3 requests the terminal apparatus 1 for the CSI report will be described. A CSI report setting corresponding to the index of the CSI report setting included in one or the CSI report setting is identified, and the CSI is reported based on the CSI report setting.

In a case that the reporting mode in the CSI report setting is "periodic", each time the CSI report setting is configured, the terminal apparatus 1 may periodically report the CSI based on the CSI setting.

In a case that the reporting mode in the CSI report setting is "semi-persistent," the terminal apparatus 1 may report the CSI based on the CSI report setting in a period from the configuration of the CSI report and the activation of the CSI report to the deactivation of the CSI report.

Here, the activation of the CSI report may mean that the terminal apparatus 1 recognizes that CSI can be reported based on the CSI report setting. For the activation, the base station apparatus 3 may activate the reference signal in the MAC layer for the terminal apparatus 1, and the information for activating the reference signal may be included in the MAC control element or the MAC protocol data unit. The terminal apparatus 3 performs reception in the MAC layer, and reports CSI based on the CSI report setting after T (ms). The deactivation of the CSI report may be indicated in the MAC layer. Further, the deactivation may be implemented with the CSI reported based on the CSI report setting, only for a predetermined or configured period of time after the CSI report has been activated. Note that T described above may be included in the CSI report setting or may be predefined. In addition, in a case that the time until the reference signal is deactivated is preset in the MAC layer, it may be included in the CSI report setting.

Here, one or a plurality of indices of the CSI report setting associated with the CSI report to be activated may be included as information about the MAC layer for activating and/or deactivating the CSI report.

One or a plurality of indices of one or a plurality of CSI measurements may be included as information about the MAC layer for activating and/or deactivating the CSI report. For example, in a case that one or a plurality of CSI measurement settings are triggered in the MAC layer, the CSI measurement setting with which the activation is preformed may be indicated by a bitmap or may be collectively coded. A bit in each field corresponds to an index of each CSI report, and the CSI report corresponding to the field in which 1 is set is activated. The CSI report corresponding to the field in which 0 is set is deactivated.

In a case that the transmission method in the CSI report setting is "semi-persistent", the terminal apparatus 1 may be requested (triggered) with DCI to report the CSI. Here, CSI may be reported based on the CSI report setting in the subframe designated by the DCI or after. The DCI may indicate to the terminal apparatus 1 to terminate the reception of the CSI report. The DCI may include an index of one or a plurality of CSI measurements configured by the CSI measurement setting.

In a case that the transmission method in the CSI report setting is "aperiodic", the CSI request may be reported to the terminal apparatus 1 with DCI. Here, CSI may be reported based on the CSI report setting once or a plurality of times in the subframe designated by the DCI or in the first PUSCH or PUCCH resource after the subframe designated by the DCI. The DCI may include an index of one or a plurality of CSI measurements configured. Information, included in the DCI, indicating which CSI measurement setting is triggered may be indicated by a bitmap, or may be collectively coded. Thus, the CSI measurement and CSI report can be efficiently implemented.

Next, an example of the relationship relative to the CSI process will be described. One or a plurality of CSI processes may be configured for the terminal apparatus 3. Typically, a CSI process ID may be used as an identity of CSI measurement and CSI report for a radio link established with each of a plurality of base station apparatuses 3, in a case that Coordinated Multi-Point (CoMP) is implemented with the plurality of base station apparatuses 3. However, it is not limited to the Coordinated Multi-Point with the plurality of base station apparatuses 3.

One CSI process may be associated with one CSI measurement setting. A plurality of CSI measurement settings may be associated with one CSI process. A CSI-RS resource setting may be associated with a CSI process. An IM setting may be associated with a CSI process. Alternatively, the "CSI measurement setting" may also be referred to as "CSI process".

An example of the above described content is described below. It is assumed that three CSI report settings (CSI reports settings C1, C2, and C3) and two RS settings (RS settings R1 and R2) are configured. Here, the CSI report settings C1, C2, and C3, and the RS settings R1 and R2 are configured as described below.

CSI report setting C1:
  Operation in time direction: semi-persistent
  Frequency domain granularity: wide band
  CSI type: CQI
CSI Report setting C2:
  Operation in time direction: aperiodic
  Frequency domain granularity: wide band
  CSI type: RI, CQI
CSI report setting C3:
  Operation in time direction: aperiodic
  Frequency domain granularity: subband (4 resource blocks)
  CSI Type: RI, CQI, PMI, CRI
RS Setting R1:
  Operation in time direction: semi-persistent
  Resource: CSI-RS setting #1
  Reference signal type: CSI-RS
RS Setting R2:
  Operation in time direction: aperiodic
  Resource: CSI-RS setting #2
  Reference signal type: CSI-RS Here, it is assumed that three CSI measurement settings (M1, M2, and M3) are configured, and each CSI measurement setting includes the following CSI report setting, RS setting, and reference transmission mode.

CSI measurement setting M1:
  CSI report setting C1
  RS setting R1
  Reference transmission mode: transmission diversity
CSI measurement setting M2:
  CSI report setting C2
  RS setting R1
  Reference transmission mode: open loop MIMO
CSI measurement setting M3:
  CSI report setting C3
  RS setting R2
  Reference transmission mode: closed loop MIMO Here, in a case that the CSI report corresponding to the CSI measurement settings M1 and M2 is performed, the base station apparatus 3 requests for the CSI measurement and report corresponding to the CSI measurement settings M1 and M2 by using MAC CE or MAC PDU in the MAC layer, and the terminal apparatus 1 preforms the CSI measurement corresponding to the CSI measurement settings M1 and M2 and performs the CSI reporting.

For example, the RS setting R1 of the CSI measurement setting M1 activates the semi-persistent transmission in the MAC layer. At this time, the base station apparatus 3 puts an index associated with the setting R1 and/or M1 in the information indicating activation. The terminal apparatus 1 recognizes a CSI-RS resource based on time and/or frequency and/or code (orthogonal code, M sequence, cyclic shift, etc.) of the CSI-RS setting #1 based on the index, and performs the CSI measurement until the deactivation.

The base station apparatus 3 requests the terminal apparatus 1 for a report on the CSI report setting C1, for performing CSI measurement and CSI reporting corresponding to the CSI measurement setting M1. Because the operation in the time domain of the CSI report setting C1 is semi-persistent, the CSI reporting is activated by the MAC layer of the base station apparatus 3. The terminal apparatus 1 reports CSI using resources for the CSI report until the deactivation.

In a case of reporting CSI, the terminal apparatus 1 may report the index associated with the CSI and CSI measurement setting M1 and/or CSI report setting C1 together with the CSI. This index may be defined as one of CSIs.

Similarly, for the CSI measurement setting M2, the base station apparatus 3 may activate the reference signal for the RS setting R1 and perform the CSI measurement. The CSI report setting C2 is associated with the CSI report. Here, because the time direction operation of the CSI report setting C2 is aperiodic, a CSI report is requested with DCI, and the terminal apparatus 1 reports CSI with the CSI report resource in a case that the request for CSI report is received by the base station apparatus 3 with DCI. This CSI report resource may be a PUSCH resource scheduled by the base station apparatus 3.

In a case of reporting CSI, the terminal apparatus 1 may report the index associated with the CSI and CSI measurement setting M2 and/or CSI report setting C2 together with the CSI. This index may be defined as one of CSIs.

Note that, in a case that a plurality of CSI measurement settings are configured for the terminal apparatus 1, one or a plurality of reference signals may be activated and/or deactivated with information indicating single activation for a reference signal based on an RS setting for activation and/or deactivation in the MAC layer.

Note that, in a case that a plurality of CSI measurement settings are configured for the terminal apparatus 1, one or a plurality of CSI reporting may be activated and/or deactivated with information indicating single activation for a reference CSI report based on a CSI report setting for activation and/or deactivation in the MAC layer.

Note that in a case that a plurality of CSI measurement settings are configured for the terminal apparatus 1, a reference signals associated with one or a plurality of RS settings may be transmitted in one DCI for transmission of the reference signal triggered in the physical layer.

Note that in the case that a plurality of CSI measurement settings are configured for the terminal apparatus 1, a CSI report associated with one or a plurality of CSI report settings may be requested with one DCI for the CSI report triggered in the physical layer.

An interference measurement resource (IM) indicates a resource for measuring interference in the case of the downlink. Thus, the base station apparatus 3 configures one or a plurality of IM setting(s) for the terminal apparatus 1. The interference resource setting may include the following settings.

Operation in time direction operation (transmission method)
Reference signal type The operation in the time direction may indicate a method for transmitting a reference signal such as an aperiodic, a semi-persistent, and a Periodic transmission methods.

The resource may indicate a resource element and/or OFDM symbol regarded as the interference measurement resource in time and/or frequency. In addition, in the case of the semi-persistent or periodic transmission, it may indicate a period and a CSI-IM transmission interval (e.g., in milliseconds, slot units, OFDM symbol units, or the like). Note that the CSI-IM resources may be indicated by an index (or identity) with these information mapped.

Note that any one of the settings of the IM setting may include the cycle, subframe offset and/or the slot offset of the reference signal that may be potentially transmitted periodically, semi-persistently, or aperiodically.

The reference signal type may indicate, for example, whether an interference measurement resource (an NZP CI-RS resource) other than the CSI-IM is to be used as the reference signal for the CSI measurement. Of course, this setting needs not to be included in a case that only the CSI-IM is used as the reference signal for the interference measurement resource.

The IM setting may be included in RS setting or may be defined separately from the RS setting. The interference resource setting may be included in the CSI measurement setting in the following manner.

Setting on one CSI report (one of the one or a plurality of CSI report settings or an index indicating the setting)
One RS setting (one of the one or a plurality of RS settings or an index indicating the setting)
One IM setting (one of the one or a plurality of IM settings or an index indicating the setting)
Reference transmission mode In this case, activation of the reception of the reference signal based on the RS setting and/or activation of the interference resource based on the IM setting may be performed in different subframes or slots, or may be performed in the same subframe or slot with one piece of information.

The CSI report setting and the RS setting may be configured with an RRC (higher layer), or may be defined in advance in the specification.

In addition to the examples described above, additional examples will be described below.

It is assumed that two CSI report settings C1 and C2 and one RS setting R1 are configured, and that combinations (C1, R1) and (C2, R1) are respectively associated with the CSI measurement settings M1 and M2.

In a case that the reference signal for the RS setting R1 is activated in the subframe n, the terminal apparatus 1 recognizes that the reference signal has been transmitted based on the RS setting R1. At this point, the CSI report has not been activated or triggered with the CSI report setting yet. In a case that the CSI report setting C1 is triggered by DCI in a subframe n+X (X is a positive integer equal to or greater than 0), the CSI measurement setting M1 is assumed based on the combination of the RS setting R1 and the CSI report setting C1, and thus the CSI measurement and the CSI reporting are performed based on the CSI measurement setting M1 and the CSI report setting C1. In this case, activation of the CSI measurement may not be defined.

In this manner, in response to the activation and triggering of the reference signal associated with the RS setting and the activation or the triggering of the CSI setting, the terminal apparatus 1 may perform channel measurement and CSI reporting based on the associated channel measurement setting.

As another example, in a case that the CSI reporting associated with the CSI report setting M1 is activated in the subframe n, the terminal apparatus 1 recognizes the establishment of a state where the CSI reporting can be performed based on the CSI report setting C1. At this point, the RS has not been activated or triggered with the RS setting yet. In a case that the reference signal associated with the RS setting R1 is activated in a subframe n+X (X is a positive integer equal to or greater than 0), the CSI measurement setting M1 is assumed based on the combination of the RS setting R1 and the CSI report setting C1, and thus the CSI measurement and the CSI reporting are performed based on the CSI measurement setting M1 and the CSI report setting C1. In this case, activation of the CSI measurement may not be defined.

In this manner, in response to the activation and triggering of the reference signal associated with the RS setting and the activation or the triggering of the CSI setting, the terminal apparatus 1 may perform channel measurement and CSI report based on the associated channel measurement setting.

As another example, in a case that the CSI report associated with the CSI report setting M1 is activated in the subframe n, the terminal apparatus 1 recognizes that a state where the CSI reporting can be performed based on the CSI measurement setting M1 is established. I this case, a reference signal based on the CSI report setting C1 based on the CSI report setting C1 associated with the CSI measurement setting M1 and the RS setting R1 is activated. The terminal apparatus 1 performs the CSI measurement and CSI reporting based on these settings. In this case, activation of the reference signal based on the RS setting R1 and activation of the CSI reporting based on the CSI report setting C1 may not be defined.

In this example, in a case that the operation of the time domain of the RS setting R1 is "semi-persistent" and the CSI report setting is "aperiodic", a method may be employed in which in response to activation of CSI measurement based on the CSI measurement setting M1, a reference signal is activated based on the RS setting R1 and the terminal apparatus 1 receives a trigger for requesting a CSI report with DCI during the activated period.

Here, the RS setting may be defined as a resource setting including the IM setting. Additionally, one CSI measurement setting may be configured and may be defined as a link setting linking one RS setting and one CSI report setting to each other. A resource set including a plurality of CSI-RS resources may be activated by MAC CE based on the resource setting, and a resource of the CSI measurement reference signal triggered from the resource set may be indicated by DCI.

The time frequency resource used by the terminal apparatus 1 to perform CSI reporting or CQI reporting is controlled by the base station apparatus 3. CSI reporting may be one of periodic, semi-persistent, and aperiodic. The terminal apparatus 1 may be configured with one or a plurality of periodic, semi-persistent, and aperiodic at the same time. In a case that periodic CSI reporting and aperiodic CSI reporting occur in the same subframe on a certain cell group or a cell, only the aperiodic report is transmitted in that subframe. In a case that semi-persistent CSI reporting and aperiodic CSI reporting occur in the same subframe, only the aperiodic report is transmitted in that subframe. In a case that periodic CSI report and semi-persistent CSI reporting occur in the same subframe, only the semi-persistent report is transmitted in that subframe.

In a case that the terminal apparatus 1 employs a multicarrier transmission (for example, CP-OFDM), the time frequency resource used by the terminal apparatus 1 to perform CSI reporting or CQI reporting is controlled by the base station apparatus 3. The CSI reporting may be periodic, semi-persistent, or aperiodic. The terminal apparatus 1 may configure one or a plurality of periodic, semi-persistent, and aperiodic, at the same time. In a case that periodic CSI reporting and aperiodic CSI reporting occur in the same subframe in a certain cell group or cell, the periodic CSI report and the aperiodic CSI report are transmitted in that subframe. In a case that semi-persistent CSI reporting and aperiodic CSI reporting occur in the same subframe, a semi-persistent CSI report and an aperiodic CSI report are transmitted in that subframe. In a case that periodic CSI reporting and semi-persistent CSI reporting occur in the same subframe, the periodic CSI report and the semi-persistent CSI report are transmitted in that subframe.

The time frequency resource used by the terminal apparatus 1 to perform CSI reporting or CQI reporting is controlled by the base station apparatus 3. CSI reporting may be one of periodic, semi-persistent, and aperiodic. The terminal apparatus 1 may configure one or a plurality of periodic, semi-persistent, and aperiodic at the same time. In a case that periodic CSI reporting and aperiodic CSI reporting occurs in the same subframe in a certain cell groups or a cell, only the aperiodic report is transmitted in that subframe. In a case that semi-persistent CSI reporting and aperiodic CSI reporting are performed in the same subframe, only an aperiodic report is transmitted in that subframe. In a case that periodic CSI report and semi-persistent CSI reporting occur in the same subframe, only the periodic CSI report may be transmitted in that subframe.

The time frequency resource used by the terminal apparatus 1 to perform CSI reporting or CQI reporting is controlled by the base station apparatus 3. CSI reporting may be one of periodic, semi-persistent, and aperiodic. The terminal apparatus 1 may configure one or a plurality of periodic, semi-persistent, and aperiodic at the same time. In a case that periodic CSI reporting and aperiodic CSI reporting occurs in the same subframe on a certain cell groups or a cell, only the aperiodic report is transmitted in that subframe. In a case that semi-persistent CSI reporting and aperiodic CSI reporting occur in the same subframe, only the semi-persistent CSI reporting of the semi-persistent CSI may be transmitted in that subframe. In a case that periodic CSI report and semi-persistent CSI reporting occur in the same subframe, only the semi-persistent CSI report may be transmitted in that subframe.

One aspect of the present embodiment may be operated in carrier aggregation or dual connectivity with Radio Access Technology (RAT), such as LTE and LTE-A/LTE-A Pro. This may be used in some or all of cells or cell groups, or some or all carriers or carrier groups (such as primary cell (PCell), secondary cell (SCell), primary secondary cells (PSCell), Master Cell Group (MCG), Secondary Cell Group (SCG), for example). Moreover, it may be employed in a stand-alone application where a stand-alone operation is performed.

Configurations of apparatuses according to the present embodiment will be described below. Here, an example is described where CP-OFDM is applied as a downlink radio transmission mode and CP DFTS-OFDM (SC-FDM) is applied as an uplink radio transmission mode.

Figure 6:
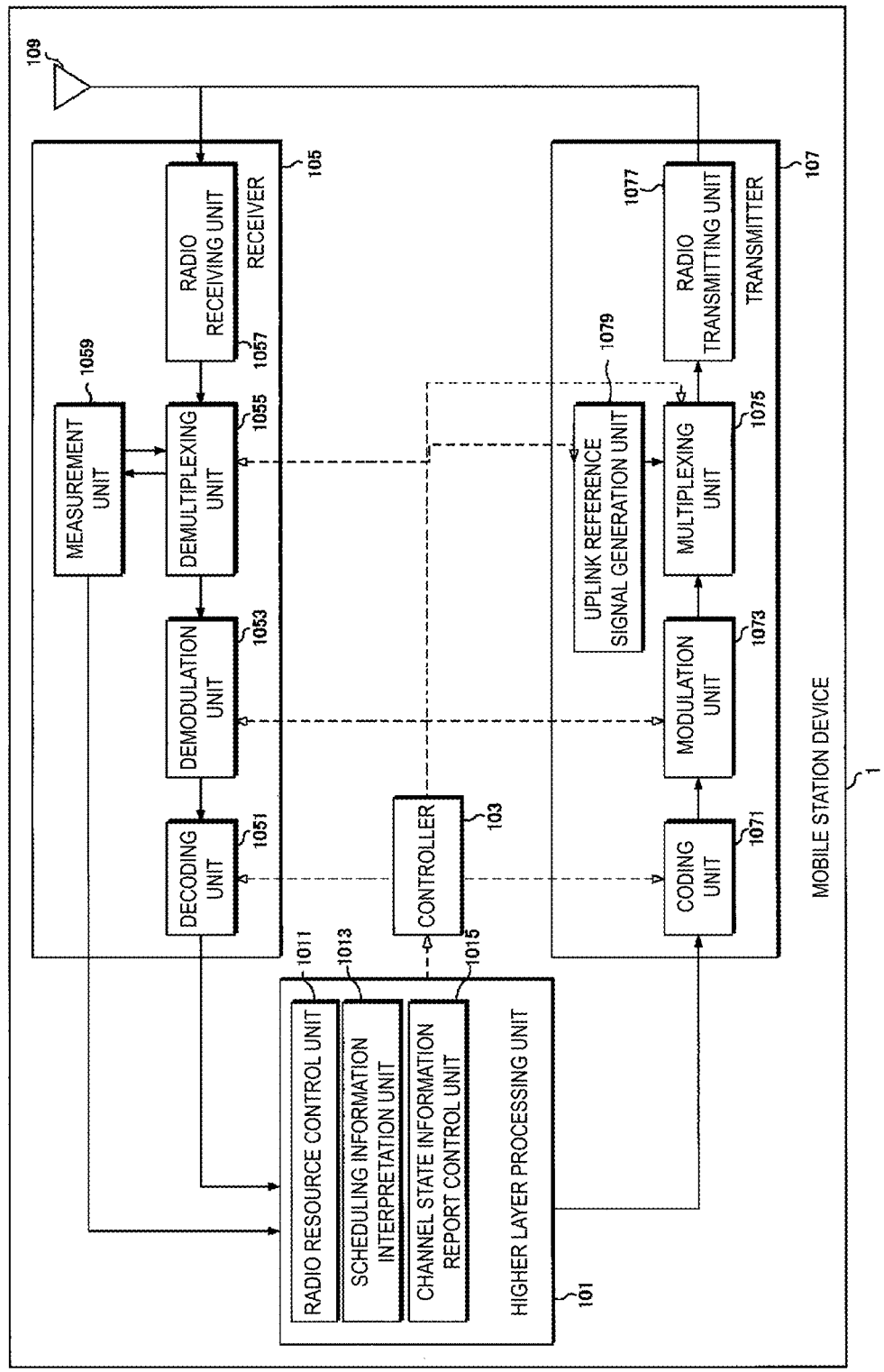
FIG. 6 is a schematic block diagram illustrating a configuration of a terminal apparatus 1 according to the present embodiment.

FIG. 6 is a schematic block diagram illustrating a configuration of the terminal apparatus 1 according to the present embodiment. As illustrated in FIG. 9, the terminal apparatus 1 is configured to include a higher layer processing unit 101, a control unit 103, a receiver 105, a transmitter 107, and a transmit and/or receive antenna 109. Furthermore, the higher layer processing unit 101 is configured to include a radio resource control unit 1011, a scheduling information interpretation unit 1013, and a Channel State Information (CSI) report control unit 1015. Furthermore, the receiver 105 is configured to include a decoding unit 1051, a demodulation unit 1053, a demultiplexing unit 1055, a radio reception unit 1057, and a measurement unit 1059. The transmitter 107 is configured to include a coding unit 1071, a modulation unit 1073, a multiplexing unit 1075, a radio transmission unit 1077, and an uplink reference signal generation unit 1079.

The higher layer processing unit 101 outputs the uplink data (the transport block) generated by a user operation or the like, to the transmitter 107. The higher layer processing unit 101 performs processing of a Medium Access Control (MAC) layer, a Packet Data Convergence Protocol (PDCP) layer, a Radio Link Control (RLC) layer, and a Radio Resource Control (RRC) layer.

The radio resource control unit 1011 included in the higher layer processing unit 101 manages various pieces of configuration information of the terminal apparatus 1 itself. Furthermore, the radio resource control unit 1011 generates information to be mapped to each uplink channel, and outputs the generated information to the transmitter 107.

The scheduling information interpretation unit 1013 included in the higher layer processing unit 101 interprets the DCI format (scheduling information) received through the receiver 105, generates control information for control of the receiver 105 and the transmitter 107, in accordance with a result of interpreting the DCI format, and outputs the generated control information to the control unit 103.

The CSI report control unit 1015 indicates to the measurement unit 1059 to derive Channel State Information (RI/PMI/CQI/CRI) relating to the CSI reference resource. The CSI report control unit 1015 indicates to the transmitter 107 to transmit RI/PMI/CQI/CRI. The CSI report control unit 1015 sets a configuration that is used in a case that the measurement unit 1059 calculates CQI.

In accordance with the control information originating from the higher layer processing unit 101, the control unit 103 generates a control signal for control of the receiver 105 and the transmitter 107. The control unit 103 outputs the generated control signal to the receiver 105 and the transmitter 107 to control the receiver 105 and the transmitter 107.

In accordance with the control signal input from the control unit 103, the receiver 105 demultiplexes, demodulates, and decodes a reception signal received from the base station apparatus 3 through the transmit and/or receive antenna 109, and outputs the resulting information to the higher layer processing unit 101.

The radio reception unit 1057 converts (down-converts) a downlink signal received through the transmit and/or receive antenna 109 into a signal of an intermediate frequency, removes unnecessary frequency components, controls an amplification level in such a manner as to suitably maintain a signal level, performs orthogonal demodulation on the basis of an in-phase component and an orthogonal component of the received signal, and converts the resulting orthogonally-demodulated analog signal into a digital signal. The radio reception unit 1057 removes a portion corresponding to a Guard Interval (GI) from the digital signal resulting from the conversion, performs Fast Fourier Transform (FFT) on the signal from which the Guard Interval has been removed, and extracts a signal in the frequency domain.

The demultiplexing unit 1055 demultiplexes the extracted signal into downlink PCCH, PSCH, and the downlink reference signal. Furthermore, the demultiplexing unit 1055 makes a compensation of channels including PCCH and PSCH from the channel estimate input from the measurement unit 1059. Furthermore, the demultiplexing unit 1055 outputs the downlink reference signal resulting from the demultiplexing, to the measurement unit 1059.

The demodulation unit 1053 demodulates the downlink PCCH and outputs a result of the demodulation to the decoding unit 1051. The decoding unit 1051 attempts to decode the PCCH. In a case of succeeding in the decoding, the decoding unit 1051 outputs downlink control information resulting from the decoding and an RNTI to which the downlink control information corresponds, to the higher layer processing unit 101.

The demodulation unit 1053 demodulates the PSCH in compliance with a modulation scheme notified with the downlink grant, such as Quadrature Phase Shift Keying (QPSK), 16 Quadrature Amplitude Modulation (QAM), 64 QAM, or 256 QAM and outputs a result of the demodulation to the decoding unit 1051. The decoding unit 1051 decodes the data in accordance with information on transmission or an original coding rate notified with the downlink control information, and outputs, to the higher layer processing unit 101, the downlink data (the transport block) resulting from the decoding.

The measurement unit 1059 performs downlink path loss measurement, channel measurement, and/or interference measurement from the downlink reference signal input from the demultiplexing unit 1055. The measurement unit 1059 outputs, to the higher layer processing unit 101, the measurement result and CSI calculated based on the measurement result. Furthermore, the measurement unit 1059 calculates a downlink channel estimate from the downlink reference signal and outputs the calculated downlink channel estimate to the demultiplexing unit 1055.

The transmitter 107 generates the uplink reference signal in accordance with the control signal input from the control unit 103, codes and modulates the uplink data (the transport block) input from the higher layer processing unit 101, multiplexes PUCCH, PUSCH, and the generated uplink reference signal, and transmits a result of the multiplexing to the base station apparatus 3 through the transmit and/or receive antenna 109.

The coding unit 1071 performs coding on the Uplink Control Information and the uplink data input from the higher layer processing unit 101. The modulation unit 1073 modulates the coded bits input from the coding unit 1071, in compliance with the modulation scheme such as BPSK, QPSK, 16 QAM, 64 QAM, or 256 QAM.

The uplink reference signal generation unit 1079 generates a sequence acquired according to a rule (formula) prescribed in advance, based on a physical cell identifier (also referred to as a Physical Cell Identity (PCI), a cell ID, or the like) for identifying the base station apparatus 3, a bandwidth to which the uplink reference signal is mapped, a cyclic shift notified with the uplink grant, a parameter value for generation of a DMRS sequence, and the like.

On the basis of the information used for the scheduling of PUSCH, the multiplexing unit 1075 determines the number of PUSCH layers to be spatial-multiplexed, maps multiple pieces of uplink data to be transmitted on the same PUSCH to multiple layers through Multiple Input Multiple Output Spatial Multiplexing (MIMO SM), and performs precoding on the layers.

In accordance with the control signal input from the control unit 103, the multiplexing unit 1075 performs Discrete Fourier Transform (DFT) on modulation symbols of PSCH. Furthermore, the multiplexing unit 1075 multiplexes PCCH and PSCH signals and the generated uplink reference signal for each transmit antenna port. To be more specific, the multiplexing unit 1075 maps the PCCH and PSCH signals and the generated uplink reference signal to the resource elements for each transmit antenna port.

The radio transmission unit 1077 performs Inverse Fast Fourier Transform (IFFT) on a signal resulting from the multiplexing, performs modulation in compliance with an SC-FDM scheme, adds the Guard Interval to the SC-FDMA-modulated SC-FDM symbol, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and/or receive antenna 109 for transmission.

Figure 7:
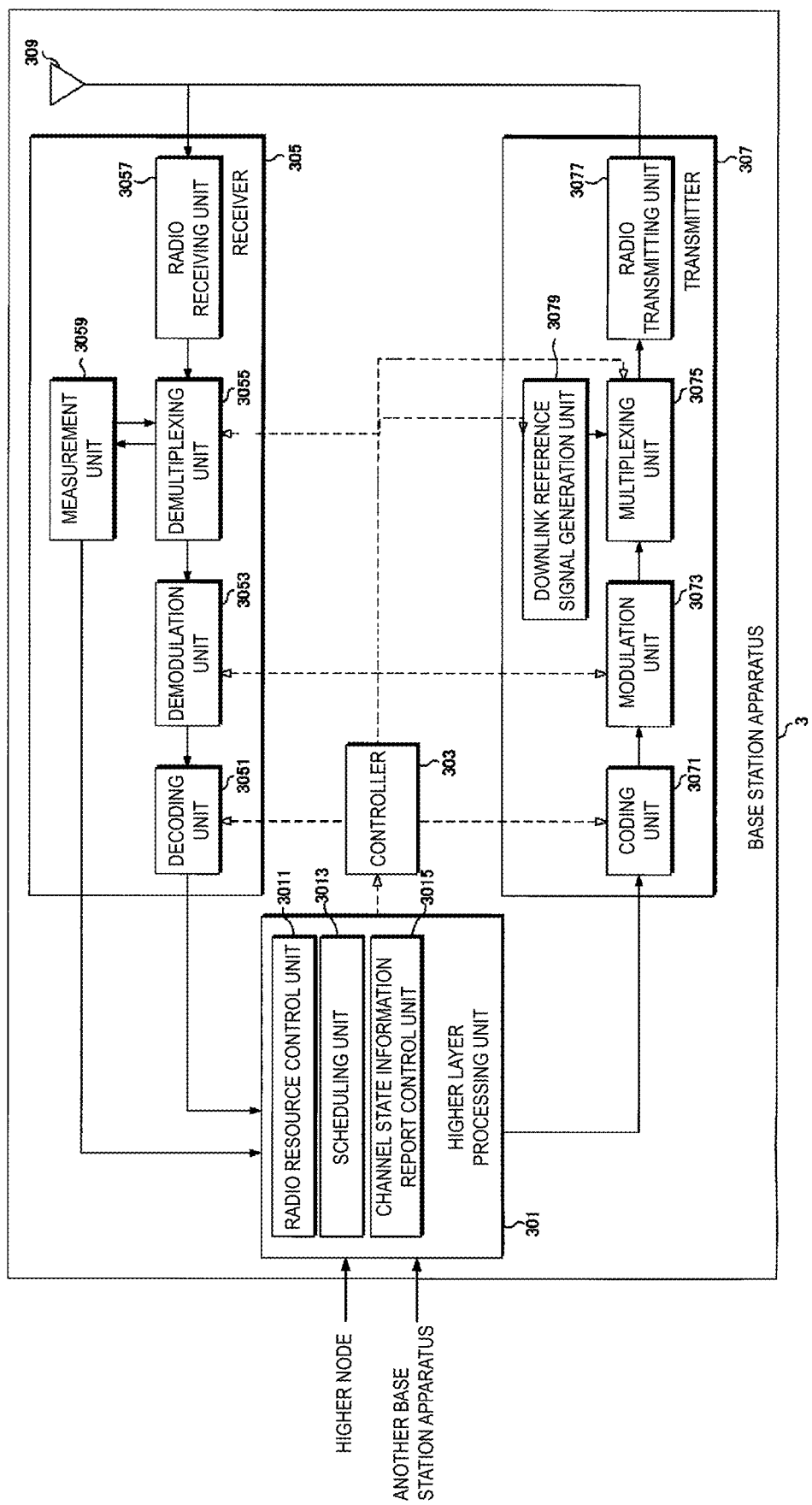
FIG. 7 is a schematic block diagram illustrating a configuration of a base station apparatus 3 according to the present embodiment.

FIG. 7 is a schematic block diagram illustrating a configuration of the base station apparatus 3 according to the present embodiment. As is illustrated, the base station apparatus 3 is configured to include a higher layer processing unit 301, a control unit 303, a receiver 305, a transmitter 307, and a transmit and/or receive antenna 309. The higher layer processing unit 301 is configured to include a radio resource control unit 3011, a scheduling unit 3013, and a CSI report control unit 3015. The receiver 305 is configured to include a decoding unit 3051, a demodulation unit 3053, a demultiplexing unit 3055, a radio reception unit 3057, and a measurement unit 3059. The transmitter 307 is configured to include a coding unit 3071, a modulation unit 3073, a multiplexing unit 3075, a radio transmission unit 3077, and a downlink reference signal generation unit 3079.

The higher layer processing unit 301 performs processing of a Medium Access Control (MAC) layer, a Packet Data Convergence Protocol (PDCP) layer, a Radio Link Control (RLC) layer, and a Radio Resource Control (RRC) layer.

Furthermore, the higher layer processing unit 301 generates control information for control of the receiver 305 and the transmitter 307, and outputs the generated control information to the control unit 303.

The radio resource control unit 3011 included in the higher layer processing unit 301 generates, or acquires from a higher node, the downlink data (the transport block) mapped to the downlink PSCH, system information, the RRC message, the MAC Control Element (CE), and the like, and outputs a result of the generation or the acquirement to the transmitter 307. Furthermore, the radio resource control unit 3011 manages various configuration information for each of the terminal apparatuses 1.

The scheduling unit 3013 included in the higher layer processing unit 301 determines a frequency and a subframe to which the physical channels (PSCH) are allocated, the transmission coding rate and modulation scheme for the physical channels (PSCH), the transmit power, and the like, from the received CSI and from the channel estimate, channel quality, or the like input from the measurement unit 3059. The scheduling unit 3013 generates the control information in order to control the receiver 305 and the transmitter 307 in accordance with a result of the scheduling, and outputs the generated information to the control unit 303. The scheduling unit 3013 generates the information (e.g., the DCI format) to be used for the scheduling of the physical channels (PSCH), based on the result of the scheduling.

The CSI report control unit 3015 included in the higher layer processing unit 301 controls a CSI report that is made by the terminal apparatus 1. The CSI report control unit 3015 transmits information that is assumed in order for the terminal apparatus 1 to derive RI/PMI/CQI in the CSI reference resource and that shows various configurations, to the terminal apparatus 1 through the transmitter 307.

On the basis of the control information originating from the higher layer processing unit 301, the control unit 303 generates a control signal for controlling the receiver 305 and the transmitter 307. The control unit 303 outputs the generated control signal to the receiver 305 and the transmitter 307 to control the receiver 305 and the transmitter 307.

In accordance with the control signal input from the control unit 303, the receiver 305 demultiplexes, demodulates, and decodes the reception signal received from the terminal apparatus 1 through the transmit and/or receive antenna 309, and outputs information resulting from the decoding to the higher layer processing unit 301. The radio reception unit 3057 converts (down-converts) an uplink signal received through the transmit and/or receive antenna 309 into a signal of an intermediate frequency, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio reception unit 3057 removes a portion corresponding to the Guard Interval (GI) from the digital signal resulting from the conversion. The radio reception unit 3057 performs Fast Fourier Transform (FFT) on the signal from which the Guard Interval has been removed, extracts a signal in the frequency domain, and outputs the resulting signal to the demultiplexing unit 3055.

The demultiplexing unit 1055 demultiplexes the signal input from the radio reception unit 3057 into PCCH, PSCH, and the signal such as the uplink reference signal. The demultiplexing is performed based on radio resource allocation information that is determined in advance by the base station apparatus 3 using the radio resource control unit 3011 and that is included in the uplink grant notified to each of the terminal apparatuses 1. Furthermore, the demultiplexing unit 3055 makes a compensation of channels including PCCH and PSCH from the channel estimate input from the measurement unit 3059. Furthermore, the demultiplexing unit 3055 outputs an uplink reference signal resulting from the demultiplexing, to the measurement unit 3059.

The demodulation unit 3053 performs Inverse Discrete Fourier Transform (IDFT) on PSCH, acquires modulation symbols, and performs reception signal demodulation, that is, demodulates each of the modulation symbols on PCCH and PSCH, in compliance with the modulation scheme prescribed in advance, such as Binary Phase Shift Keying (BPSK), QPSK, 16 QAM, or 64 QAM, or in compliance with the modulation scheme that the base station apparatus 3 itself notifies in advance each of the terminal apparatuses 1 with the uplink grant. The demodulation unit 3053 demultiplexes the modulation symbols of multiple pieces of uplink data transmitted on the same PSCH with the MIMO SM, based on the number of spatial-multiplexed sequences notified in advance with the uplink grant to each of the terminal apparatuses 1 and information designating the precoding to be performed on the sequences.

The decoding unit 3051 decodes the coded bits of PCCH and PSCH, which have been demodulated, at the original coding rate in compliance with a coding scheme prescribed in advance, the coding rate being prescribed in advance or being notified in advance with the uplink grant to the terminal apparatus 1 by the base station apparatus 3 itself, and outputs the decoded uplink data and uplink control information to the higher layer processing unit 101. In a case where the PSCH is re-transmitted, the decoding unit 3051 performs the decoding with the coded bits input from the higher layer processing unit 301 and retained in an HARQ buffer, and the demodulated coded bits. The measurement unit 309 measures the channel estimate, the channel quality, and the like, based on the uplink reference signal input from the demultiplexing unit 3055, and outputs a result of the measurement to the demultiplexing unit 3055 and the higher layer processing unit 301.

The transmitter 307 generates the downlink reference signal in accordance with the control signal input from the control unit 303, codes and modulates the HARQ indicator, the Downlink Control Information, and the downlink data that are input from the higher layer processing unit 301, multiplexes PCCH, PSCH, and the downlink reference signal, and transmits a result of the multiplexing to the terminal apparatus 1 through the transmit and/or receive antenna 309.

The coding unit 3071 performs coding on the downlink control Information and the downlink data input from the higher layer processing unit 301. The modulation unit 3073 modulates the coded bits input from the coding unit 3071, in compliance with the modulation scheme such as BPSK, QPSK, 16 QAM, or 64 QAM.

The downlink reference signal generation unit 3079 generates, as the downlink reference signal, a sequence that is already known to the terminal apparatus 1 and that is acquired in accordance with a rule prescribed in advance based on the physical cell identity (PCI) for identifying the base station apparatus 3, or the like.

The multiplexing unit 3075, in accordance with the number of PSCH layers to be spatial-multiplexed, maps one or multiple pieces of downlink data to be transmitted on one PSCH to one or multiple layers, and performs precoding on the one or multiple layers. The multiplexing unit 375 multiplexes the downlink physical channel signal and the downlink reference signal for each transmit antenna port. Furthermore, the multiplexing unit 375 allocates the downlink physical channel signal and the downlink reference signal to the resource element for each transmit antenna port.

The radio transmission unit 3077 performs Inverse Fast Fourier Transform (IFFT) on the modulation symbol resulting from the multiplexing or the like, performs the modulation in compliance with an OFDM scheme to generate an OFDM symbol, adds the Guard Interval to the OFDM-modulated OFDM symbol, generates a digital signal in a baseband, converts the digital signal in the baseband into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency signal, removes unnecessary frequency components, performs power amplification, and outputs a final result to the transmit and/or receive antenna 309 for transmission.

(1) More specifically, a terminal apparatus 1 according to a first aspect of the present invention is a terminal apparatus for communicating with a base station apparatus, the terminal apparatus including: a receiver configured to receive a radio resource control (RRC) message for configuring aperiodic channel state information reporting, periodic channel state information reporting, and/or semi-persistent channel state information reporting; and a transmitter configured to transmit a channel state information report. The transmitter transmits, in a case that the aperiodic channel state information reporting and the periodic channel state information reporting occur in a same time period for a certain cell group, only an aperiodic channel state information report in the same time period. The transmitter transmits, in a case that the semi-persistent channel state information reporting and the aperiodic channel state information reporting occur in a same time period for a certain cell group, only the aperiodic channel state information report in the same time period. The transmitter transmits, in a case that the periodic channel state information reporting and the semi-persistent channel state information reporting occur in a same time period for a certain cell group, only a semi-persistent channel state information report in the same time period.

(2) A base station apparatus 3 according to a second aspect of the present invention is a base station apparatus for communicating with a terminal apparatus, the base station apparatus including: a transmitter configured to transmit a radio resource control (RRC) message for configuring aperiodic channel state information reporting, periodic channel state information reporting, and/or semi-persistent channel state information reporting; and a receiver configured to receive a channel state information report. The receiver receives, in a case that the aperiodic channel state information reporting and the periodic channel state information reporting occur in a same time period for a certain cell group, only an aperiodic channel state information report in the same time period. The receiver receives, in a case that the semi-persistent channel state information reporting and the aperiodic channel state information reporting occur in a same time period for a certain cell group, only the aperiodic channel state information report in the same time period. The receiver receives, in a case that the periodic channel state information reporting and the semi-persistent channel state information reporting occur in a same time period for a certain cell group, only a semi-persistent channel state information report in the same time period.

(3) A communication method according to a third aspect of the present invention is a communication method for a terminal apparatus for communicating with a base station apparatus, the communication method including the steps of: receiving a radio resource control (RRC) message for configuring aperiodic channel state information reporting, periodic channel state information reporting, and/or semi-persistent channel state information reporting; and transmitting a channel state information report. In a case that the aperiodic channel state information reporting and the periodic channel state information reporting occur in a same time period for a certain cell group, only an aperiodic channel state information report is transmitted in the same time period. In a case that the semi-persistent channel state information reporting and the aperiodic channel state information reporting occur in a same time period for a certain cell group, only the aperiodic channel state information report is transmitted in the same time period. In a case that the periodic channel state information reporting and the semi-persistent channel state information reporting occur in a same time period for a certain cell group, only a semi-persistent channel state information report is transmitted in the same time period.

(4) A communication method according to a fourth aspect of the present invention is a communication method for a base station apparatus for communicating with a terminal apparatus, the communication method including the steps of: transmitting a radio resource control (RRC) message for configuring aperiodic channel state information reporting, periodic channel state information reporting, and/or semi-persistent channel state information reporting; and receiving a channel state information report. In a case that the aperiodic channel state information reporting and the periodic channel state information reporting occur in a same time period for a certain cell group, only an aperiodic channel state information report is received in the same time period. In a case that the semi-persistent channel state information reporting and the aperiodic channel state information reporting occur in a same time period for a certain cell group, only the aperiodic channel state information report is received in the same time period. In a case that the periodic channel state information reporting and the semi-persistent channel state information reporting occur in a same time period for a certain cell group, only a semi-persistent channel state information report is received in the same time period.

(5) An integrated circuit according to a fifth aspect of the present invention is an integrated circuit implemented in a terminal apparatus for communicating with a base station apparatus, the integrated circuit including: a receiver configured to receive a radio resource control (RRC) message for configuring aperiodic channel state information reporting, periodic channel state information reporting, and/or semi-persistent channel state information reporting; and a transmitter configured to transmit a channel state information report. The transmitter transmits, in a case that the aperiodic channel state information reporting and the periodic channel state information reporting occur in a same time period for a certain cell group, only an aperiodic channel state information report in the same time period. The transmitter transmits, in a case that the semi-persistent channel state information reporting and the aperiodic channel state information reporting occur in a same time period for a certain cell group, only the aperiodic channel state information report in the same time period. The transmitter transmits, in a case that the periodic channel state information reporting and the semi-persistent channel state information reporting occur in a same time period for a certain cell group, only a semi-persistent channel state information report in the same time period.

(6) An integrated circuit according to a sixth aspect of the present invention is an integrated circuit implemented in a base station apparatus for communicating with a terminal apparatus, the integrated circuit including: a transmitter configured to transmit a radio resource control (RRC) message for configuring aperiodic channel state information reporting, periodic channel state information reporting, and/or semi-persistent channel state information reporting; and a receiver configured to receive a channel state information report. The receiver receives, in a case that the aperiodic channel state information reporting and the periodic channel state information reporting occur in a same time period for a certain cell group, only an aperiodic channel state information report in the same time period. The receiver receives, in a case that the semi-persistent channel state information reporting and the aperiodic channel state information reporting occur in a same time period for a certain cell group, only the aperiodic channel state information report in the same time period. The receiver receives, in a case that the periodic channel state information reporting and the semi-persistent channel state information reporting occur in a same time period for a certain cell group, only a semi-persistent channel state information report in the same time period.

A program running on an apparatus according to an aspect of the present invention may serve as a program that controls a Central Processing Unit (CPU) and the like to cause a computer to operate in such a manner as to realize the functions of the above-described embodiment according to the present invention. Programs or the information handled by the programs are temporarily stored in a volatile memory such as a Random Access Memory (RAM), a non-volatile memory such as a flash memory, a Hard Disk Drive (HDD), or any other storage device system.

Note that a program for realizing functions of an embodiment related to an aspect of the present invention may be recorded in a computer-readable recording medium. The functions may be realized by causing a computer system to read the program recorded in the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining a program for a short time, or any other computer-readable recording medium.

Furthermore, each functional block or various characteristics of the apparatuses used in the above-described embodiment may be implemented or performed in an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit or an analog circuit. Furthermore, in a case that with advances in semiconductor technology, a circuit integration technology appears that replaces the present integrated circuits, one or more aspects of the present invention can use a new integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a radio LAN apparatus, or a sensor device), an integrated circuit (for example, a communication chip), or a program.

REFERENCE SIGNS LIST 1 (1A, 1B, 1C) Terminal apparatus
3 Base station apparatus
10 TXRU
11 Phase shifter
12 Antenna
101 Higher layer processing unit
103 Control unit
105 Receiver
107 Transmitter
109 Antenna
301 Higher layer processing unit
303 Control unit
305 Receiver
307 Transmitter
1013 Scheduling information interpretation unit
1015 Channel State Information report control unit
1051 Decoding unit
1053 Demodulation unit
1055 Demultiplexing unit
1057 Radio reception unit
1059 Measurement unit
1031 Coding unit
1073 Modulation unit
1075 Multiplexing unit
1077 Radio transmission unit 1079 Uplink reference signal generation unit
3011 Radio resource control unit
3013 Scheduling unit
3015 Channel State Information report control unit
3051 Decoding unit
3053 Demodulation unit
3055 Demultiplexing unit
3057 Radio reception unit
3059 Measurement unit
3071 Coding unit
3073 Modulation unit
3075 Multiplexing unit
3077 Radio transmission unit
3079 Downlink reference signal generation unit

The invention claimed is:

1. A terminal device comprising:
higher layer processing circuitry configured to receive, by using radio resource control signaling, a first configuration for an aperiodic channel state information (CSI) report, the first configuration including a first information indicating that a transmission method for the aperiodic CSI report is aperiodic, a second configuration for a semi-persistent CSI report, the second configuration including a second information indicating that a transmission method for the semi-persistent CSI report is semi-persistent, a third configuration for an aperiodic CSI reference signal (CSI-RS), the third configuration including a third information indicating that a transmission method for the aperiodic CSI-RS is aperiodic, a fourth configuration for a semi-persistent CSI-RS, the fourth configuration including a fourth information indicating that a transmission method for the semi-persistent CSI-RS is semi-persistent, a fifth configuration for a periodic CSI report, the fifth configuration including a fifth information indicating that a transmission method for the periodic CSI report is periodic, and a sixth configuration for a periodic CSI-RS, the sixth configuration including a sixth information indicating that a transmission method for the periodic CSI-RS is periodic, the third information being different from the first information, the fourth information being different from the second information, the sixth information being different from the fifth information; and
transmission circuitry configured to, in a case that the semi-persistent CSI report with measurement of the semi-persistent CSI-RS and the aperiodic CSI report with measurement of the semi-persistent CSI-RS occur in a same time duration on a cell, transmit the aperiodic CSI report, without transmitting the semi-persistent CSI report, on a physical uplink shared channel (PUSCH) in the same time duration on the cell,
wherein the semi-persistent CSI report is triggered by first downlink control information (DCI) included in a first PDCCH, and
the aperiodic CSI report is triggered by second DCI included in a second PDCCH.

2. The terminal device according to claim 1, wherein
the transmission circuitry is configured to, in a case that the semi-persistent CSI report and the periodic CSI report occur in a same time duration on the cell, transmit the semi-persistent CSI report, without transmitting the periodic CSI report, on a PUSCH in the same time duration on the cell, and
the higher layer processing circuitry is configured to receive, by using the radio resource control signaling, a fifth configuration for the periodic CSI report.

3. A base station device comprising:
higher layer processing circuitry configured to transmit, by using radio resource control signaling, a first configuration for an aperiodic channel state information (CSI) report, the first configuration including a first information indicating that a transmission method for the aperiodic CSI report is aperiodic, a second configuration for a semi-persistent CSI report, the second configuration including a second information indicating that a transmission method for the semi-persistent CSI report is semi-persistent, a third configuration for an aperiodic CSI reference signal (CSI-RS), the third configuration including a third information indicating that a transmission method for the aperiodic CSI-RS is aperiodic, a fourth configuration for a semi-persistent CSI-RS, the fourth configuration including a fourth information indicating that a transmission method for the semi-persistent CSI-RS is semi-persistent, a fifth configuration for a periodic CSI report, the fifth configuration including a fifth information indicating that a transmission method for the periodic CSI report is periodic, and a sixth configuration for a periodic CSI-RS, the sixth configuration including a sixth information indicating that a transmission method for the periodic CSI-RS is periodic, the third information being different from the first information, the fourth information being different from the second information, the sixth information being different from the fifth information; and
reception circuitry configured to, in a case that the semi-persistent CSI report with measurement of the semi-persistent CSI-RS and the aperiodic CSI report with measurement of the semi-persistent CSI-RS occur in a same time duration on a cell, receive the aperiodic CSI report, without receiving the semi-persistent CSI report, on a physical uplink shared channel (PUSCH) in the same time duration on the cell,
wherein the semi-persistent CSI report is triggered by first downlink control information (DCI) included in a first physical downlink control channel (PDCCH), and
the aperiodic CSI report is triggered by second DCI included in a second PDCCH.

4. The base station device according to claim 3, wherein
the reception circuitry is configured to, in a case that the semi-persistent CSI report and the periodic CSI report occur in a same time duration on the cell, receive the semi-persistent CSI report, without receiving the periodic CSI report, on a PUSCH in the same time duration on the cell, and
the higher layer processing circuitry configured to transmit, by using radio resource control signaling, a fifth configuration for the periodic CSI report.

5. A communication method of a terminal device comprising:
receiving, by using radio resource control signaling, a first configuration for an aperiodic channel state information (CSI) report, the first configuration including a first information indicating that a transmission method for the aperiodic CSI report is aperiodic, a second configuration for a semi-persistent CSI report, the second configuration including a second information indicating that a transmission method for the semi-persistent CSI report is semi-persistent, a third configuration for an aperiodic CSI reference signal (CSI-RS), the third configuration including a third information indicating that a transmission method for the aperiodic CSI-RS is aperiodic, a fourth configuration for a semi-persistent CSI-RS, the fourth configuration including a fourth information indicating that a transmission method for the semi-persistent CSI-RS is semi-persistent, a fifth configuration for a periodic CSI report, the fifth configuration including a fifth information indicating that a transmission method for the periodic CSI report is periodic, and a sixth configuration for a periodic CSI-RS, the sixth configuration including a sixth information indicating that a transmission method for the periodic CSI-RS is periodic, the third information being different from the first information, the fourth information being different from the second information, the sixth information being different from the fifth information; and transmitting the aperiodic CSI report, without transmitting the semi-persistent CSI report, on a physical uplink shared channel (PUSCH) in a same time duration on a cell, in a case that the semi-persistent CSI report with measurement of the semi-persistent CSI-RS and the aperiodic CSI report with measurement of the semi-persistent CSI-RS occur in the same time duration on the cell, wherein the semi-persistent CSI report is triggered by first downlink control information (DCI) included in a first PDCCH, and the aperiodic CSI report is triggered by second DCI included in a second PDCCH.

6. A communication method of a base station device comprising:

transmitting, by using radio resource control signaling, a first configuration for an aperiodic channel state information (CSI) report, the first configuration including a first information indicating that a transmission method for the aperiodic CSI report is aperiodic, a second configuration for a semi-persistent CSI report, the second configuration including a second information indicating that a transmission method for the semi-persistent CSI report is semi-persistent, a third configuration for an aperiodic CSI reference signal (CSI-RS), the third configuration including a third information indicating that a transmission method for the aperiodic CSI-RS is aperiodic, a fourth configuration for a semi-persistent CSI-RS, the fourth configuration including a fourth information indicating that a transmission method for the semi-persistent CSI-RS is semi-persistent, a fifth configuration for a periodic CSI report, the fifth configuration including a fifth information indicating that a transmission method for the periodic CSI report is periodic, and a sixth configuration for a periodic CSI-RS, the sixth configuration including a sixth information indicating that a transmission method for the periodic CSI-RS is periodic, the third information being different from the first information, the fourth information being different from the second information, the sixth information being different from the fifth information; and receiving the aperiodic CSI report, without receiving the semi-persistent CSI report, on a physical uplink shared channel (PUSCH) in a same time duration on a cell, in a case that the semi-persistent CSI report with measurement of the semi-persistent CSI-RS and the aperiodic CSI report with measurement of the semi-persistent CSI-RS occur in the same time duration on the cell, wherein the semi-persistent CSI report is triggered by first downlink control information (DCI) included in a first physical downlink control channel (PDCCH), and the aperiodic CSI report is triggered by second DCI included in a second PDCCH.

* * * * *